US010162507B2

(12) United States Patent
Funami et al.

(10) Patent No.: US 10,162,507 B2
(45) Date of Patent: Dec. 25, 2018

(54) DISPLAY CONTROL APPARATUS, DISPLAY CONTROL SYSTEM, A METHOD OF CONTROLLING DISPLAY, AND PROGRAM

(71) Applicants: Atsushi Funami, Tokyo (JP); Nobuyuki Kishi, Tokyo (JP); Katsutaro Watabe, Chiba (JP); Yutaka Moriya, Tokyo (JP)

(72) Inventors: Atsushi Funami, Tokyo (JP); Nobuyuki Kishi, Tokyo (JP); Katsutaro Watabe, Chiba (JP); Yutaka Moriya, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 520 days.

(21) Appl. No.: 14/482,145

(22) Filed: Sep. 10, 2014

(65) Prior Publication Data

US 2015/0095784 A1    Apr. 2, 2015

(30) Foreign Application Priority Data

Sep. 27, 2013    (JP) ................................ 2013-202703

(51) Int. Cl.
| | |
|---|---|
| G06F 3/0484 | (2013.01) |
| G06F 3/0481 | (2013.01) |
| G09G 5/14 | (2006.01) |
| G06F 3/0488 | (2013.01) |

(52) U.S. Cl.
CPC ........ *G06F 3/04847* (2013.01); *G06F 3/0481* (2013.01); *G06F 3/04845* (2013.01); *G06F 3/04883* (2013.01); *G09G 5/14* (2013.01); *G06F 2203/04806* (2013.01);
(Continued)

(58) Field of Classification Search
CPC ............................. G06F 3/0484; G06F 3/0481
See application file for complete search history.

(56) References Cited

U.S. PATENT DOCUMENTS

| | | |
|---|---|---|
| 6,253,218 B1 | 6/2001 | Aoki et al. |
| 8,019,155 B2 | 9/2011 | Hibino et al. |
| 2006/0156245 A1 | 7/2006 | Williams et al. |

(Continued)

FOREIGN PATENT DOCUMENTS

| | | |
|---|---|---|
| JP | H10-187743 | 7/1998 |
| JP | 2003-167816 | 6/2003 |

(Continued)

OTHER PUBLICATIONS

SimCity 2000 (released in 1993).*
Extended European Search Report dated Dec. 4, 2014.
Japanese Office Action for 2013-202703 dated Jul. 4, 2017.

*Primary Examiner* — David E Choi
(74) *Attorney, Agent, or Firm* — IPUSA, PLLC

(57) ABSTRACT

A display control apparatus includes an acquiring unit that acquires object information to be displayed on a screen; a storing unit that stores the acquired object information, time information, and a priority related to a display of an object corresponding to the acquired object information while associating the acquired object information, the time information, and the priority for each acquired object information; and a display controlling unit that controls a display position of the object based on the time information and the priority associated with the object information when the object is displayed on a screen.

18 Claims, 24 Drawing Sheets

(52) U.S. Cl.
CPC ............ *G09G 2340/045* (2013.01); *G09G 2340/0471* (2013.01); *G09G 2340/145* (2013.01)

(56) References Cited

U.S. PATENT DOCUMENTS

| | | |
|---|---|---|
| 2006/0236251 A1 | 10/2006 | Kataoka et al. |
| 2009/0005162 A1 | 1/2009 | Itoh |
| 2009/0070669 A1 | 3/2009 | Hirota |
| 2009/0106699 A1 | 4/2009 | Kihara et al. |
| 2009/0303246 A1 | 12/2009 | Tsuda |
| 2010/0183223 A1* | 7/2010 | Matsuoka ............... H04N 1/56 382/166 |
| 2010/0225667 A1 | 9/2010 | Nishiyama et al. |
| 2010/0302595 A1 | 12/2010 | Yamada et al. |
| 2011/0072009 A1* | 3/2011 | Tuttle ............... G06F 3/0481 707/722 |
| 2011/0112914 A1* | 5/2011 | Geer, III ............... G06Q 30/00 705/14.73 |
| 2011/0276864 A1* | 11/2011 | Oules ............... G06F 17/30017 715/202 |
| 2012/0264494 A1* | 10/2012 | Wells ............... H04L 67/38 463/1 |
| 2012/0278722 A1* | 11/2012 | Raleigh ............... H04L 12/14 715/735 |
| 2013/0024815 A1* | 1/2013 | O ............... H04M 1/72586 715/811 |
| 2013/0044921 A1* | 2/2013 | In ............... H04M 1/27455 382/115 |
| 2013/0132854 A1* | 5/2013 | Raleigh ............... G06F 3/0482 715/738 |
| 2013/0179817 A1* | 7/2013 | Bak ............... H04L 43/0882 715/771 |
| 2013/0185642 A1* | 7/2013 | Gammons ............... G06F 3/0482 715/733 |
| 2014/0082568 A1* | 3/2014 | Hulet ............... G06Q 50/01 715/853 |
| 2015/0095784 A1* | 4/2015 | Funami ............... G06F 3/0481 715/730 |

FOREIGN PATENT DOCUMENTS

| | | |
|---|---|---|
| JP | 2007-293429 | 11/2007 |
| JP | 2009-000174 | 1/2009 |
| JP | 2009-080795 | 4/2009 |
| JP | 2009-105594 | 5/2009 |
| JP | 2010-522929 | 7/2010 |
| WO | 2006/028154 | 3/2006 |
| WO | 2007/088827 | 8/2007 |

\* cited by examiner

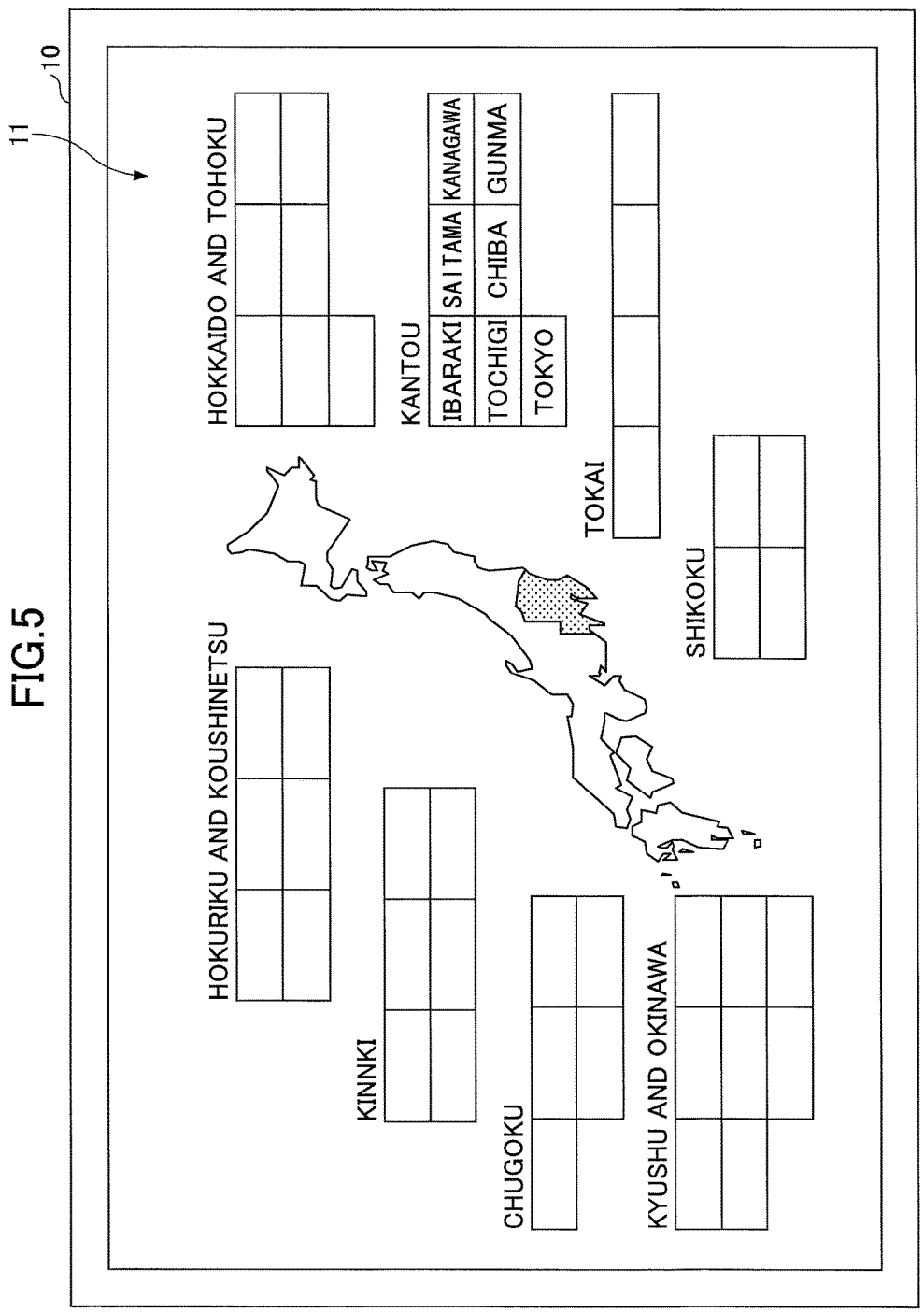

| IMAGE ID 321 | OBJECT INFORMATION 322 | ADDRESS 323 | SEX 324 | AGE RANGE 325 | TIME INFORMATION 326 | WEIGHT INFORMATION 327 | EVENT NAME 328 | APPARATUS NO. 329 |
|---|---|---|---|---|---|---|---|---|
| ID A | pic A | TOKYO | MALE | 20 | H25/9/2/15:00 | ∞ | EVENT A | 1 |
| ID B | pic B | TOKYO | FEMALE | 30 | H25/9/1/15:30 | 50 | EVENT A | 2 |
| ID C | pic C | TOKYO | FEMALE | 30 | H25/9/2/8:00 | 100 | EVENT A | 3 |
| ID D | pic D | SAITAMA | MALE | 40 | H25/11/3/9:00 | 80 | EVENT B | 1 |

| WEIGHT INFORMATION 327 | FRAME COLOR 352 | FRAME TYPE 353 |
|---|---|---|
| ∞ | GOLD | FOR CELEBRITY |
| 100~ | SILVER | FOR ORDINARY PEOPLE |
| 50~99 | COPPER | FOR ORDINARY PEOPLE |

| TREE NO. 371 | NUMBER OF CARD 372 |
|---|---|
| 1 | 0~500 |
| 2 | 501~1000 |
| 3 | 1001~1500 |
| 4 | 1501~2000 |
| 5 | 2001~ |

FIG.11
(a)
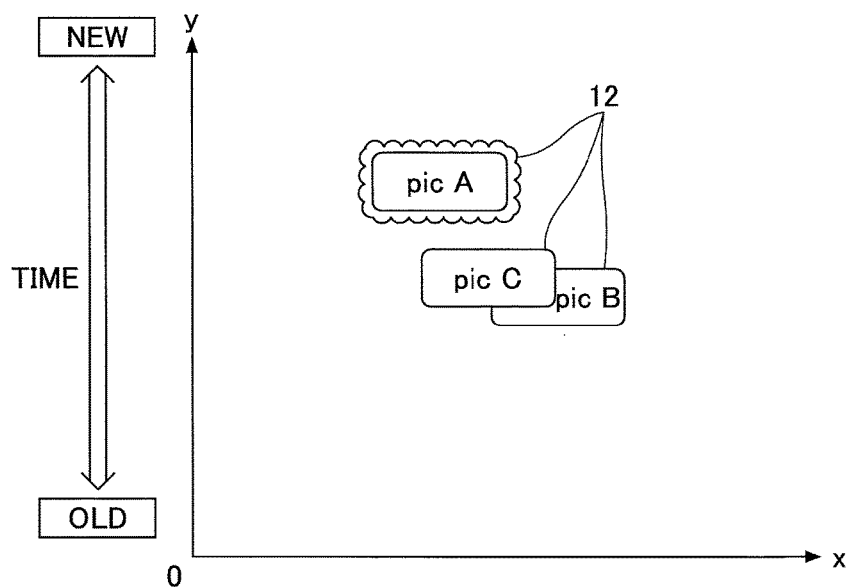
(b)
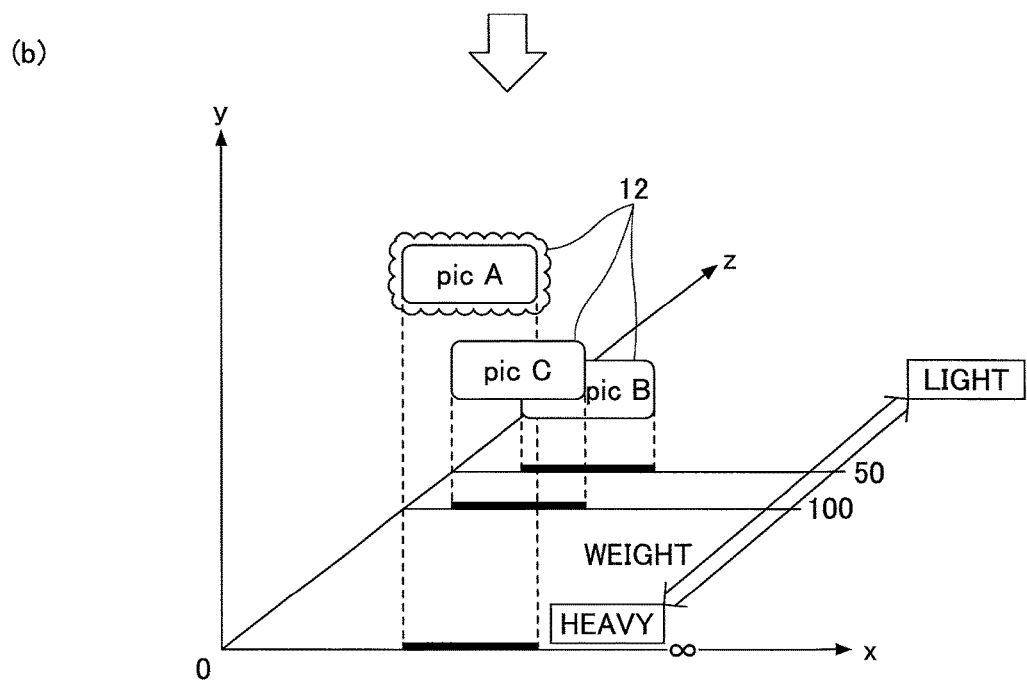

FIG.12
(a)
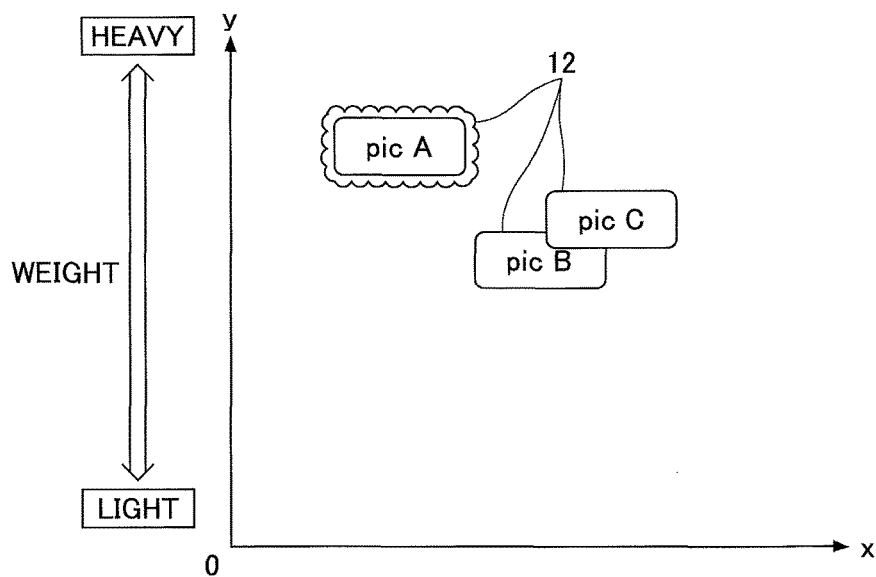
(b)
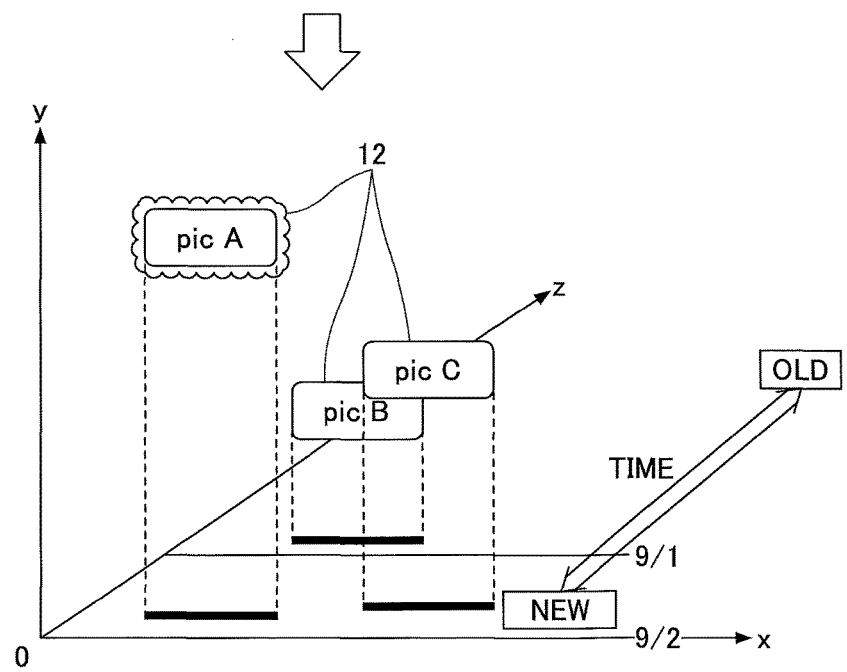

DISPLAY CONTROL APPARATUS, DISPLAY CONTROL SYSTEM, A METHOD OF CONTROLLING DISPLAY, AND PROGRAM

BACKGROUND OF THE INVENTION

1. Field of the Invention

The present invention relates to a display control apparatus, a display control system, a method of controlling display, and a program.

2. Description of the Related Art

Throughout the world and through the ages, events have been carried out in which many people gather, each person materializes his own current wishes or gratitude into a given form, and each of the materialized forms is gathered in a certain location. In many cases, the wish of each person is written on a medium such as a paper, etc. For example, in Japan the wish of each person is written down on a strip of paper called a "tanzaku" that is used during the Tanabata festival, a small wooden plaque called an "ema" that is dedicated to a shrine, or is written down by other various means, and gathered at one location. The mediums on which the wishes are written are collected by stringing them to a tree or by attaching them to a wall such that the wishes or gratitude are shared by associated participants.

For example, Japanese National Publication of International Patent Application No. 2010-522929 discloses a method of orderly disposing images captured by a user in association with a date of capturing the image or an incident occurring on the date, and presenting them as a group of digital objects.

However, in most cases where a medium such as paper is used, a space for displaying the medium on which a message is written is physically limited. In each event, the many collected mediums overlap to disable the associate participants from being able to see a part of the mediums displayed at a high or inner position. Therefore, thoughts cannot be shared among the participants. After each event ends, it becomes difficult for the participants to see the shared thoughts of the participants. Further, the medium on which the thoughts are written is required to be left at the displayed place and cannot be taken out. Therefore, a memory is not left over of the participant participating in the event.

Japanese National Publication of International Patent Application No. 2010-522929 discloses a technique related to a collection of electronic data related to one user and an automatic arrangement. However, an object of sharing thoughts of associate participants in an event where many people participate and a control of display used for sharing the thoughts among the associate participants are not disclosed.

SUMMARY OF THE INVENTION

It is an object of one embodiment of the present invention to provide a display control apparatus, a display control system, a method of controlling display, and a program that substantially obviates one or more problems caused by the limitations and disadvantages of the related art One aspect of the embodiments of the present invention may be to provide a display control apparatus including an acquiring unit that acquires object information to be displayed on a screen; a storing unit that stores the acquired object information, time information, and a priority related to a display of an object corresponding to the acquired object information while associating the acquired object information, the time information, and the priority for each acquired object information; and a display controlling unit that controls a display position of the object based on the time information and the priority associated with the object information when the object is displayed on a screen.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 5 illustrates an exemplary input screen of the embodiment;

FIGS. 8A, 8B, and 8C illustrate exemplary information stored in an event information DB of the embodiment;

FIG. 11 illustrates an exemplary display control of the embodiment;

FIG. 12 illustrates another exemplary display control of the embodiment;

DETAILED DESCRIPTION OF THE PREFERRED EMBODIMENTS

A description is given below, with reference to the FIG. 1 through FIG. 22 of embodiments of the present invention. Where the same reference symbols are attached to the same parts, repeated description of the parts is omitted.

Reference symbols typically designate as follows:
1: display control system;
10: electronic whiteboard;
12: object;
15: scanner;
20: MFP;
30: server;
31: acquiring unit;
32: storing unit;
33: display controlling unit;
34: calculating unit;
40: notebook PC;
45: tablet terminal;
50: projector;
60: display apparatus;
100: tree;
320: event information DB;
321: image ID;
322: object information;
323: address;
324: sex;
325: age range;
326: time information;
327: weight information;
328: event name; and
329: apparatus no.

[Display Control System]

Figure 1:
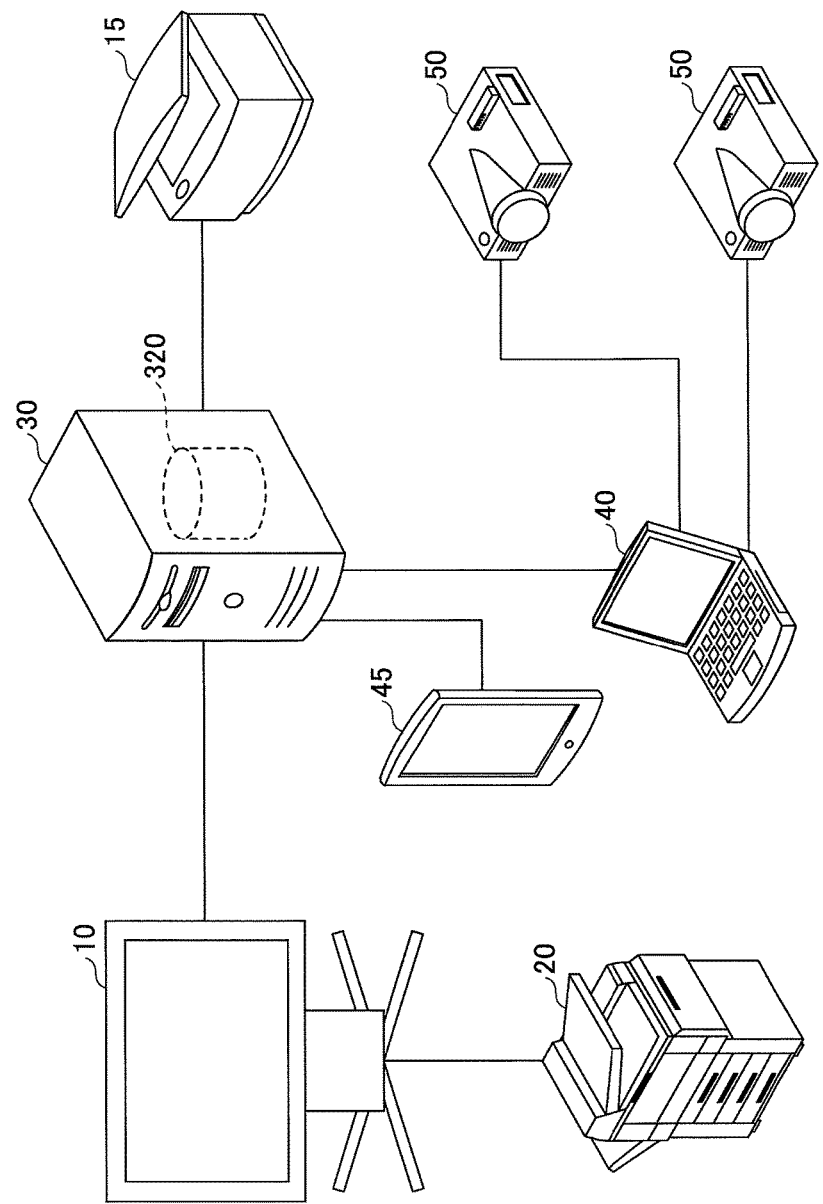
FIG. 1 illustrates a display control system according to an embodiment of the present invention.

Referring to FIG. 1, the structure of a display control system of an embodiment of the present invention is described. FIG. 1 illustrates the display control system 1 according to an embodiment of the present invention.

The display control system 1 includes an electronic whiteboard 10, a scanner 15, a multifunction peripheral (MFP), a server 30, a notebook PC 40, a tablet terminal 45, and a projector 50, which are connected through a network so as to be mutually communicated. Referring to FIG. 1, the number of the projectors 50 is two. However, the number may be one or plural. In a manner similar thereto, the numbers of the electronic whiteboard 10, the scanner 15, the MFP 20, the server 30, the notebook PC 40, and the tablet terminal 45 are one each. However, the numbers of the electronic whiteboard 10, the scanner 15, the MFP 20, the server 30, the notebook PC 40, and the tablet terminal 45 may be one or plural.

Within the embodiment, an input unit includes the electronic whiteboard 10 and the scanner 15. The electronic whiteboard 10 electrically receives a direct input of information (a direct input method). In a case of direct input method, information is input using the electronic whiteboard 10 prepared in an event site or an application. For example, the electronic whiteboard 10 receives information handwritten with a dedicated pen on the screen by an associate participant (a user) of the event or information input using a keyboard or a mouse by the associate participant (the user) of the event.

The scanner 15 inputs the information by optically reading the medium such as paper on which a message is written (an optical input method, indirect input method). In the display control system of the embodiment, the input apparatus and a scan apparatus are used to enable a use of a cross media of inputting with two systems (a direct input and an indirect input). Therefore, a person directly participating in a specific event can input his or her thought as information, further a person who does not directly participates in the specific event can send paper on which his or her thought is written to an apparatus of an event promoter to input his or her thought as the information in a manner similar to the associate participants of the event.

The electronic whiteboard 10 and the scanner 15 are examples of an object input apparatus having a function of directly or indirectly inputting an object (image data, text data, or the like) displayed on the screen and sending the object to the server 30. Therefore, as long as a use is similar to the above, a digital camera, a portable terminal having a camera function, or another apparatus can be used.

The MFP 20 is an image forming apparatus having a network function and is an example of an electronic apparatus with a print function and a communication function including a printer, a digital copier, a digital MFP, or the like. The MFP 20 can print and output image data received by a communication function from the electronic whiteboard 10 by a print function. In a case where the scanner function is used, the display control system 1 may be or may not be provided with the scanner 15 separately in addition to the MFP 20. However, in a case where a great number of associate participants gather at the event site, it is preferable to provide the scanner 15 separately in addition to the MFP 20, said differently, it is preferable to separately prepare an apparatus for inputting the image data and an apparatus for outputting the image data.

The server 30 records information input from the electronic whiteboard 10, the scanner 15, or the like in an event information DB 320 (see FIG. 8). The event information DB 320 may be stored in a predetermined memory device, for example, a memory device such as an HDD installed in the server 30 or stored in a memory device connected through a network. The server 30 performs a display control for displaying the object indicative of a record related to the event based on the object information or the like stored in the event information DB 320.

The notebook PC 40 controls a screen display by the projector 50. For example, in a case where display screen data received from the server 30 is displayed (projected) on a single display screen formed by connecting display screens of the multiple projectors 50, it is possible by the notebook PC 40 to perform the display control of the display screens displayed on the projectors. Further, it is possible to input a command for forcibly control the object to be displayed on the screen of an arbitrarily selected one of the multiple projectors 50.

The table terminal 45 displays a display screen received from the server 30 on the display apparatus which is owned by a user and can be operated by a touch operation by the user. Further, a command for searching a necessary image from the images displayed on the screen can be input in the tablet terminal 45. Further, a command for searching a necessary image from the images displayed on the screen can be input in the notebook PC. The notebook PC 40 and the tablet terminal 45 can function as an input apparatus for inputting the information. Further, it is possible to integrate at least a part of a display control function provided with the server 30 and at least a part of a display control function provided with the notebook PC 40 and the tablet terminal 45 into any one of the apparatuses (e.g., the server 30). Further, the server 30, the notebook PC 40, and the tablet terminal 45 are an apparatus provided with an ordinary computer function and an example of an information processing apparatus (a display control apparatus) of performing information processing related to the display control of the object. Therefore, as long as a use is similar to the above, a PC, a thin client, or another apparatus can be used.

The projector 50 displays (projects) a record related to the event to be displayed as the object by the server 30 on a display area of the display apparatus. A method of controlling the display by the server 30 is described later. The projector 50 and the tablet terminal 45 are examples of an object display apparatus (a display unit) having a function of displaying the object on the display screen (e.g., a display area to be projected by the display apparatus (a display medium like a screen) or a display area of the display provided with the object display apparatus itself). Therefore, as long as a use is similar to the above, a PC, a portable terminal, an electronic paper, or another apparatus can be used.

Therefore, in the display control system 1 of the embodiment, there may exist an apparatus having both of a function as the object display apparatus for displaying the object such as the table terminal 45 and a function as the display control apparatus for performing information processing of the object.

The display control system 1 of the embodiment includes the object input apparatus electronic whiteboard 10 for inputting the object, the display control apparatus which performs the display control process related to the display of the object and generates display screen to be displayed on the display screen, and the object display apparatus which displays the object based on the display screen, such as the projector.

Figure 2:
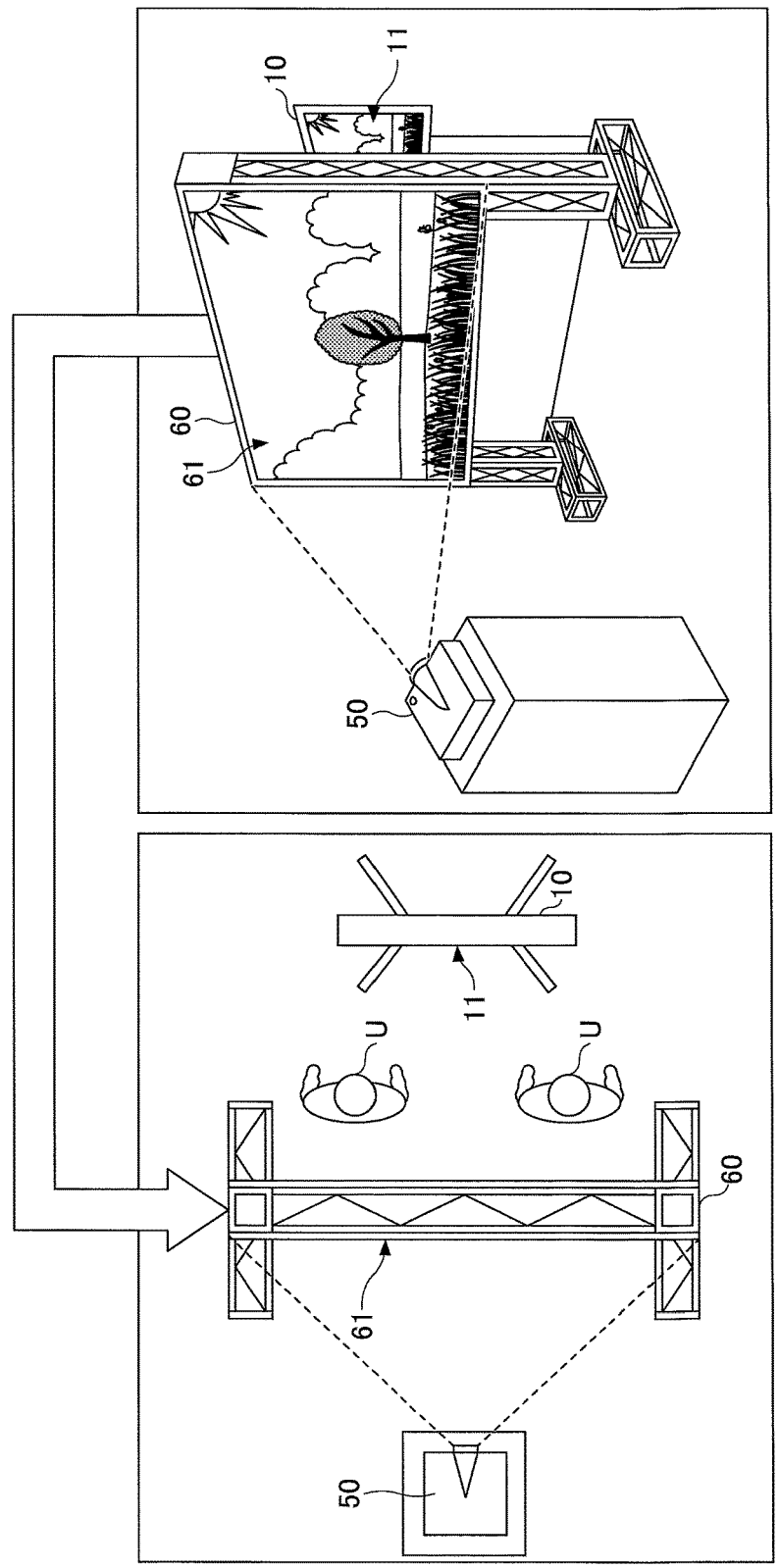
FIG. 2 illustrates an exemplary arrangement of a display apparatus and an input apparatus of the embodiment.

FIG. 2 illustrates an exemplary arrangement in a certain event site of the display apparatus and the input apparatus of the embodiment. The projector 50 outputs to display a record related to the event to be displayed as the object on a large screen 61 of the display apparatus (a display area) 60. Referring to FIG. 2, the electronic whiteboard 10 is arranged on a side opposite to the screen 61 of the display apparatus 60. For example, an associate participant U in an event site watches the screen 61 of the display apparatus 60 and thereafter may stand in front of an input screen 11 of the electronic whiteboard 10 and may input information using a special pen. In this case, in order to increase the number of the associate participants who can leave their thoughts as many as possible, it is possible to limit a time after starting a record for one associate participant until finishing the record to shorten a time of occupying the electronic whiteboard 10. The arrangements and the numbers of the display apparatus 60 and the electronic whiteboard 10 are not limited to the arrangements and the numbers the display apparatus 60 and the electronic whiteboard 10 illustrated in FIG. 2. Thus, an example of the display control system of the embodiment is described.

In the event site, the object information of a card, on which wish is written, specific object information, or the like are allocated to, for example, a key (a first key) of the keyboard of the notebook PC. Thus, the operator (the user) of the notebook PC pushes the key of the keyboard to designate the object subjected to a zoom-in display in a specific projector. Such a use is useful when there is provided a participatory event where the master of ceremony and the associate participants gather in addition to the projector 50 for displaying the object and is further provided a corner for the master of ceremony and the associate participants can comment on a specific object. At this time, in the projector 50 for displaying the object for the corner, a specific object 40 can be designated for outputting from the notebook PC 40. Therefore, it is possible to display the specific object at a timing cued by the master of ceremony. The object to be commented may be a still image or a moving image.

As a specific scene, the event held at the event site is described. However, the scene is an example of utilizing the present invention, the scope of applying the present invention is not limited to where and what event is held.

[Functional Configuration of Server]

Figure 3:
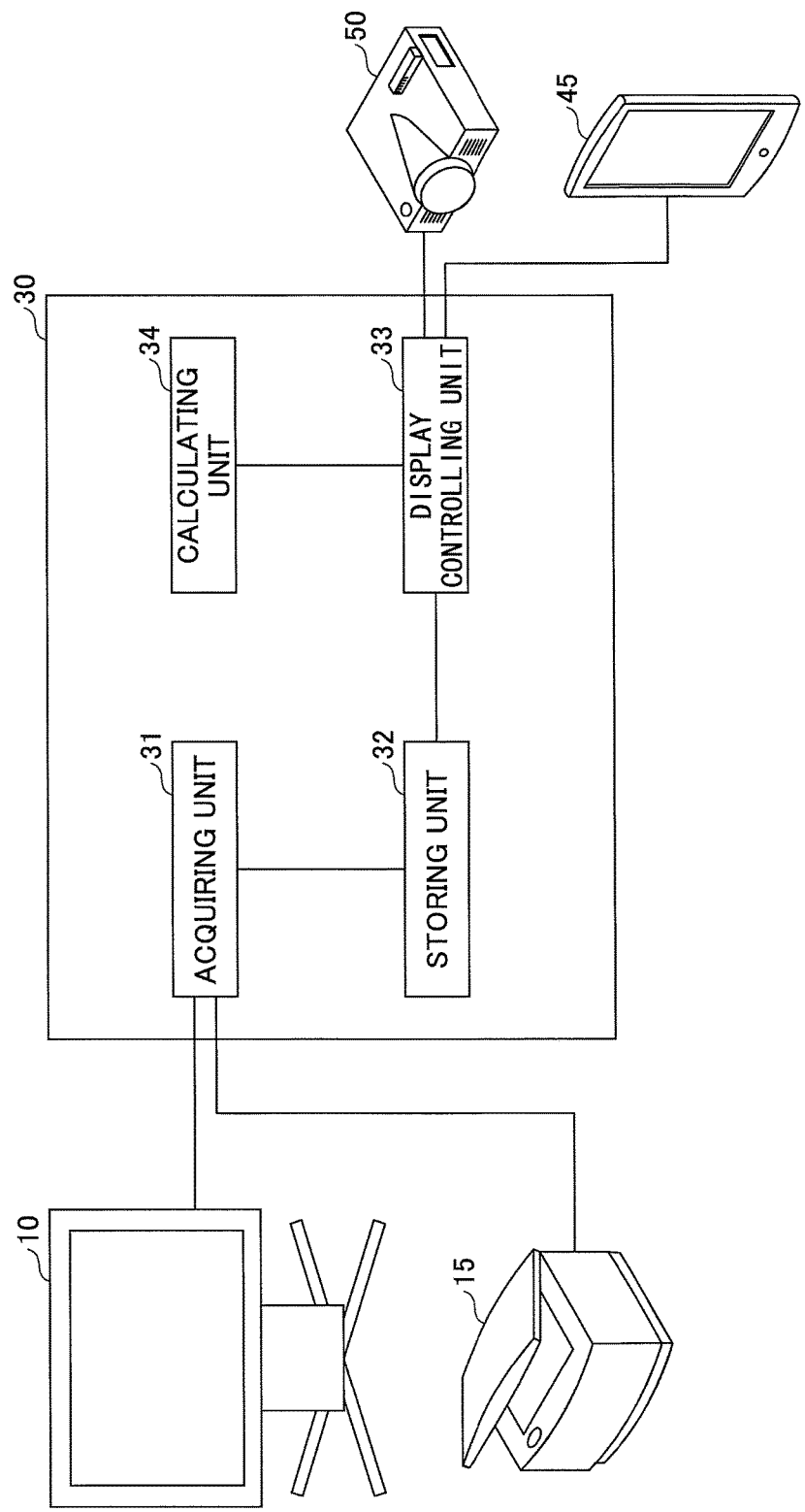
FIG. 3 illustrates an exemplary functional configuration of a server of the embodiment.

Next, referring to FIG. 3, an exemplary functional configuration of the server 30 of the embodiment is described. FIG. 3 illustrates an exemplary functional configuration of the server 30 of the embodiment. The server 30 includes an acquiring unit 31, a storing unit 32, a display controlling unit 33, and a calculating unit 34.

The acquiring unit 31 acquires object information for displaying a record related to the event on the object on the screen. Information input from the electronic whiteboard 10 and information read by the scanner 15 are examples of the object information acquired by the acquiring unit 31. The acquiring unit 31 may obtain by receiving object information in which a thought or a message from a celebrity or another associate participant is written.

The storing unit 32 stores the object information acquired by the acquiring unit 31, the time information related to the event displayed in the object, and the event information including a priority related to the display of the object in the event information DB 320 described later.

The display controlling unit 33 controls a display position of the object displayed on the screen based on the acquired object information based on the time information stored in association with the object information and a priority. A display content controlled by a display controlling unit 33 is output from the projector 50 and is displayed on the display apparatus 60. Further, the display content controlled by the display controlling unit 33 is displayed by a display apparatus provided with the tablet terminal 45.

The calculating unit 34 calculates the number of the objects displayed on the screen. As described above, the exemplary functional configuration of the server 30 of the embodiment is described. The server 30 is an exemplary display control apparatus for controlling the display position of the object indicative of the record related to the event on the screen.

The display content (display screen data) controlled by the display controlling unit 33 of the server 30 is received by the notebook PC 40 or the tablet terminal 45 so as to further perform a display control of the display apparatus. Said differently, the notebook PC 40 and the tablet terminal 45 may be provided with the display controlling unit.

For example, in a case where a display control of a specific projector 50 is performed or in a case where a display control provided with a specific function such as a search function is performed, instead of performing the display control of all the display apparatuses by the server 30, the server 30 may perform a display control common to all the display apparatuses and the notebook PC or the tablet terminal 45 may perform a display control different from the display control common to all the display apparatuses. As an example, a display control causing an object designated to a specific projector 50 to display or a screen control performed in response to a user operation of requiring searching or browsing may be performed by the tablet terminal 45.

It is appropriately determined whether multiple processes of controlling a display on the display apparatus is performed by only the server 30 or a cooperation of the server 30 and at least one of the notebook PC 40 and the tablet terminal 45. The functional configuration illustrated in FIG. 3 is described as the functional configuration of the server 30. However, the functional configuration illustrated in FIG. 3 can be understood as a functional configuration of a display control system substantialized by multiple apparatuses (display control apparatuses) of performing display controls, such as the server 30 and the notebook PC 40 or the server 30 and the tablet terminal 45.

[Input Process]
(Direct Input Method)

Figure 4:
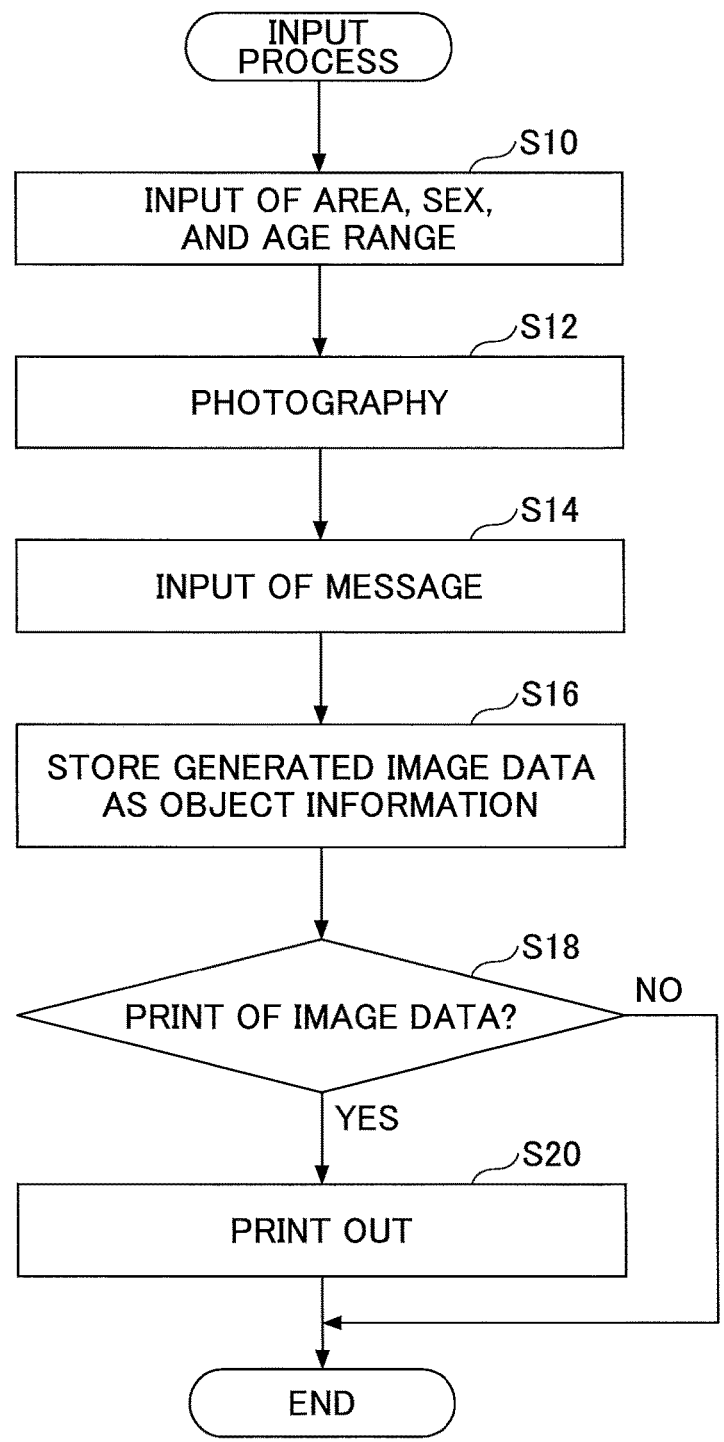
FIG. 4 is a flowchart illustrating an exemplary input process of the embodiment.

Next, referring to FIG. 4, an exemplary input process of the embodiment is described. FIG. 4 is a flowchart illustrating the exemplary input process of the embodiment. The input process of a direct input method using the electronic whiteboard 10 is exemplified.

After the input process of the embodiment is started, in response to a selection operation or an input operation by the associate participant of the event (the user), the electronic whiteboard 10 inputs attribute information of the associate participant such as an area where the address of the associate participant exists, sex of the associate participant, or an age range of the associate participant in step S10. FIG. 5 illustrates an exemplary screen for inputting the area displayed on the electronic whiteboard 10. When the associate participant selects the own address using the screen illustrated in FIG. 5, the area information of the associate participant is input on the electronic whiteboard 10.

Next, in response to an operation by the associate participant, the electronic whiteboard 10 photographs associate participant's photograph inside a frame of the event provided by the event promoter in step S12 and inputs a message onto the photograph in step S14. The photography is performed by a built-in camera or an external camera. Only one of steps S12 and S14 may be performed. Next, the electronic whiteboard 10 sends the generated image data as the object information to the event information DB 320 to store the generated image data in the event information DB 320 (step S16). Further, the attribute information of the associate participant and identification information for identifying the electronic whiteboard 10, such as a machine number, are sent the event information DB 320 so as to be stored in the event information DB 320 in association with the object information.

Figure 6A:
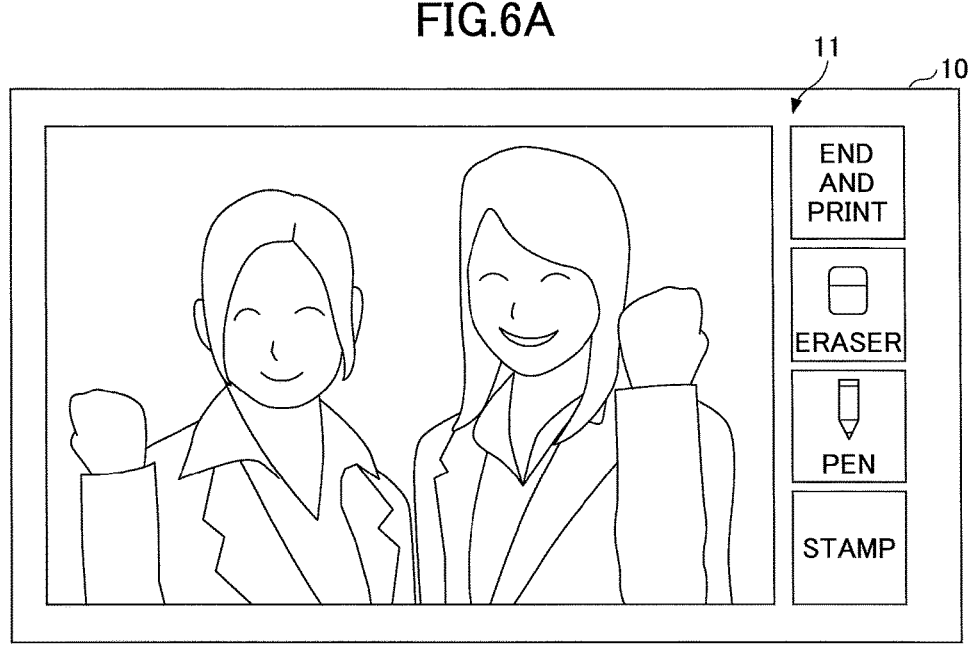
FIGS. 6A and 6B illustrate exemplary input screens of the embodiment.
Figure 6B:
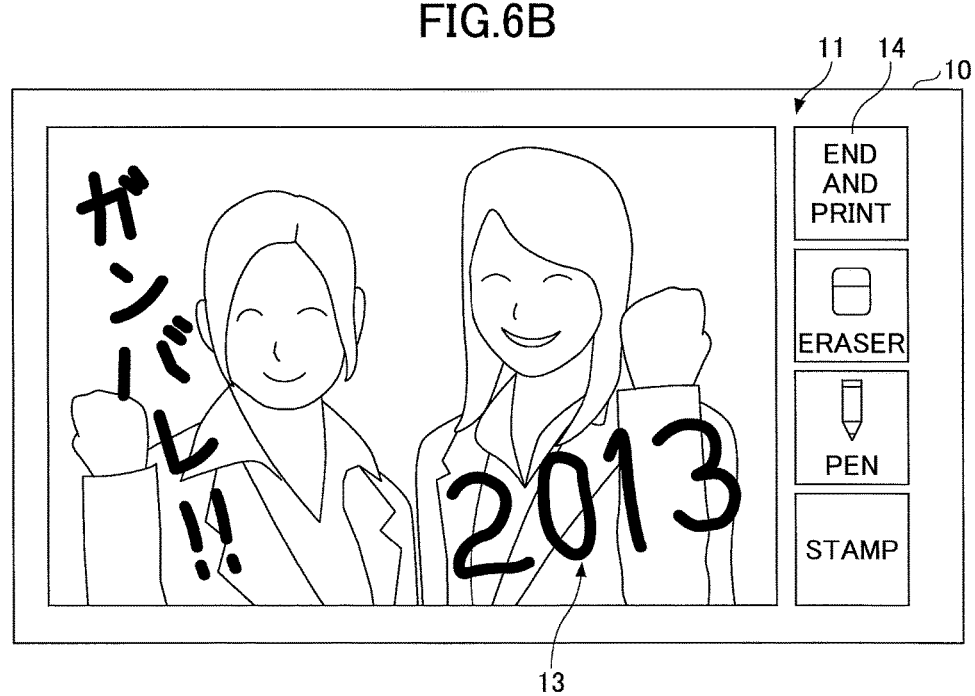

FIG. 6A illustrates an exemplary state where associate participants are photographed by a camera (not illustrated) attached to the electronic whiteboard 10. FIG. 6B illustrates an exemplary state where a message 13 is input onto the photograph in response to an operation by the associate participants. The photograph or the message 13 is an exemplary record for the event. Meanwhile, a background image is previously stores and an image of a photographic subject of a person is overlapped on the background image.

In this state, it is determined by the electronic whiteboard 10 whether the image data such as an input photograph is printed in step S18. In a case where a print button 14 on the upper right corner is pushed, the electronic whiteboard 10 determines that the image data is printed. Therefore, printing is performed in step S20. Thereafter, the input process ends. A serial number of the image data (the object) is printed on a paper, on which the image data is printed. In a case where the print button 14 is not pushed, the electronic whiteboard 10 does not perform printing and ends the input process. An exemplary input process of the embodiment is described.

Figure 7:
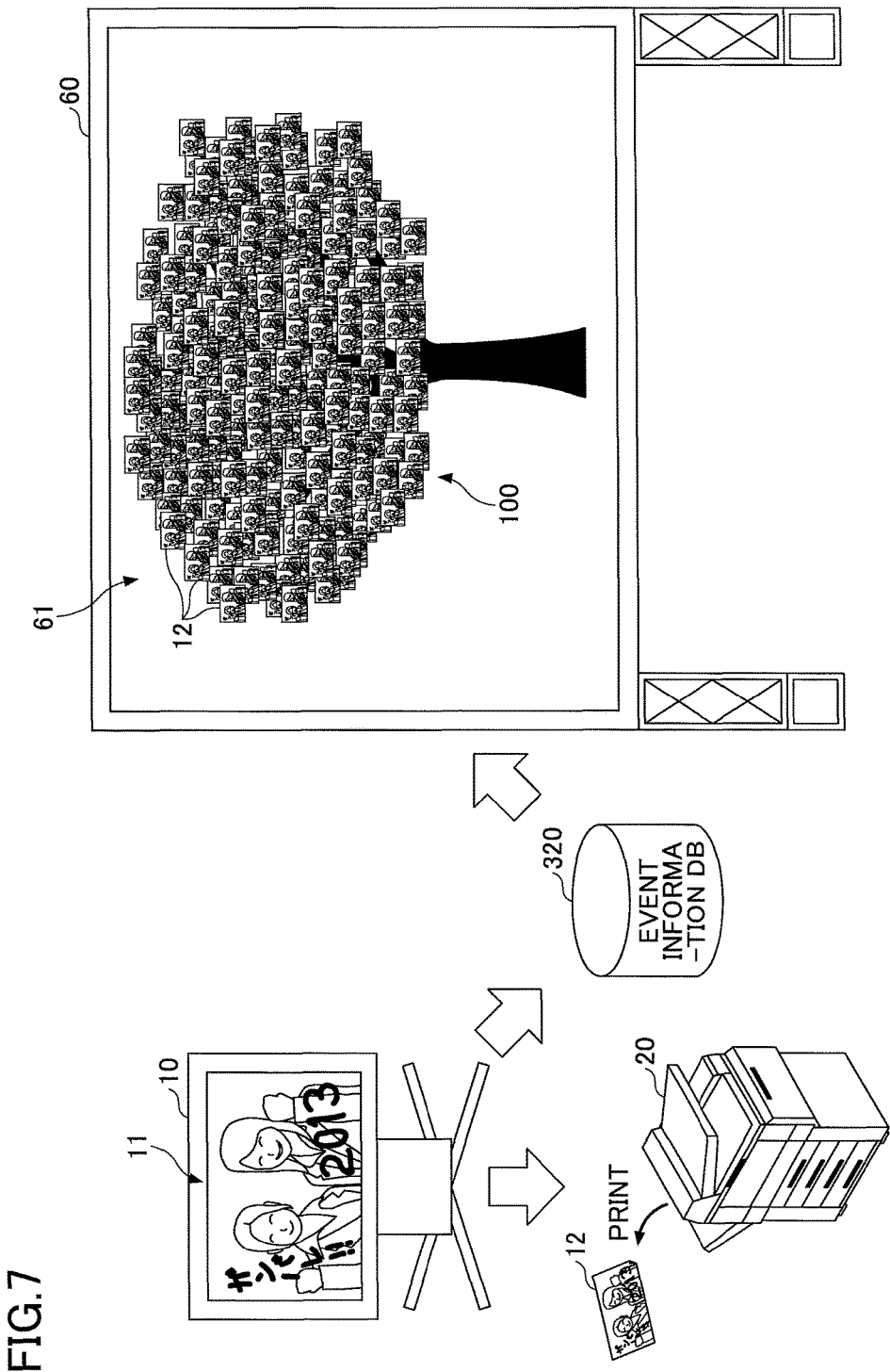
FIG. 7 explains processes from an input of information to a display control of the embodiment.

With this, as illustrated in FIG. 7, the electronic whiteboard 10 located in the event site is used to input image data including an image of the associate participant and a message on the electronic whiteboard 10. The input image data can be printed by the MFP 20 and brought back by the associate participant as a remembrance of the event. Further, attribute information of the associate participant is input using the electronic whiteboard 10. The attribute information is stored in the event information DB 320 so that the attribute information is associated with the object information, which is input information such as the image data.

According to the above-described input process of the embodiment, the associate participant photographs himself or herself by the camera, combines the photograph with a frame or a stamp related to the event, and write a message or a painting on the photograph. The event promoter can obtain the completed object information such as the image data, which can display the thought of the associate participant as the record of the event. Further, when the associate participant inputs the address, the age, the sex or the like, the attribute information of the associate participant can be accumulated in the event information while associating the attribute information with the object information.

Further, the completed object information such as image data where the thought of the associate participant is shown can be printed and provided to the associate participant. Accordingly, it is possible to maintain the thought at the time of participating in the event on the side of the associate participant.

The attribute information of the associate participant is not limited to the above-described age range, sex, area, or the like. Further, the area is not limited to Japanese prefectural and city governments and may include other countries. For example, a selection button may be prepared on the screen illustrated in FIG. 5 to enable to designate the other country. In a case where the selection button is pushed, a screen for inputting information designating the country (e.g., a country code for international telephone) may be displayed.

(Event Information DB)

An event information DB 320 stored by the storing unit 32 is described in detail. FIG. 8A illustrates exemplary information stored in the event information DB 320.

The event information DB 320 stores object information 322 and further stores image ID 321, address 323, sex 324, age range 325, time information 326, weight information 327, event name 328, and apparatus no. 329 in association with each object information 322. The object information 322 is information for displaying a record related to the event on the object on the screen. The above-described image data or text data is an example of the object information 322. Within the embodiment, it is possible to display multiple objects on the screen. The object may be data that is to be displayed and can be handled as one displayed item in display screen data displayed on the screen. The object information 322 may be a still image or a moving image. Further, the object information 322 may be a three-dimensional image or a two-dimensional image.

The image ID 321 is attached to the object information 322 so as to distinguish the object information 322. The address 323, the sex 324, and the age range 325 are examples of the attribute information of the associate participants.

The time information 326 is an example of information indicative of a date and hour related to the event where the object is displayed or the object is stored in the event information DB 320 so as to be displayed. The time information 326 may be a date and hour when a record of the event indicated by the object is performed, namely, a date and hour when image data corresponding to the object is generated. Further, the time information 326 may be a date and hour when the object information is input or read.

The weight information 327 is an example of a priority related to the display of the object and can be used as an index of a priority order in displaying the object on the screen. Said differently, the weight information 327 is an example of an evaluation parameter (evaluation information) used at a time of determining a position (a coordinate) where the object is displayed or an order of displaying overlapping objects (a relationship between the overlapping objects such as a front side or a back side). For example, the priority order in displaying the object on the screen is made higher as the weight indicated by the weight information is heavier. aid differently, as the weight indicated in the weight information 32 is higher, the object is recorded at a position easier to be observed by the associate participant.

The event name 328 is exemplary identification information of a meeting place where, for example, the electronic whiteboard 10 or the display apparatus 60 is provided. The apparatus no. 329 is an identification number of each apparatus provided in one or multiple event meeting places. The apparatuses can be identified by the apparatus no. 329.

Based on the information accumulated in the above-described event information DB, the event promoter can know "how much" thoughts are given "from where" to the event "by which people" included in the associate participants. The known result can be used for the next event. For example, the event promoter can know attributes and movements of the associate participants. Using these attributes and movements, the event promoter can collect a donation from a person who have the same thought and can perform sponsor advertisements thereby taking steps that enrich the next event.

Further, the event promoter can send a record of the participation or a message to the address 323 of the associate participant after a passage of, for example, 10 years from the event based on the information accumulated in the event information DB 320. Thus, the event promoter can plan a future event for the associate participant.

(Indirect Input Method)

Within the embodiment, an optical input method (an indirect input method) using the input apparatus such as a scanner can be used as an example of the input unit. In a case of the optical input method, each associate participant writes his or her thought on a medium having a form prepared by, for example, the event promoter. An exemplary layout of this paper includes the attribute information of the associate participant such as the address, the age range, and the sex (an area read as the attribute information) and a column on which a thought of the associate participant is expressed by a message or an image (an area read as the object information). However, the layout of the paper is not limited thereto.

The information such as the message or the image is read by the scanner 15 and is accumulated in the event information DB 320. A medium such as the paper after reading by the scanner 15 is returned to the associate participant who has provided the medium. With this, the thought of the event can be maintained on the side of the associate participant. Advantages of the optical input method are that the function of the input apparatus in the direct input method is not required, a place and a time in writing on the medium are not limited, an option of participating without publishing (displaying) a photograph of the user can be provided to the user, and so on. Although the photograph of the user is not published when the user does not exist in the frame in the direct input method, the direct input method is originally a participation method while ordinarily publishing the photograph of the user.

[Entirety Displaying Process]

Figure 9:
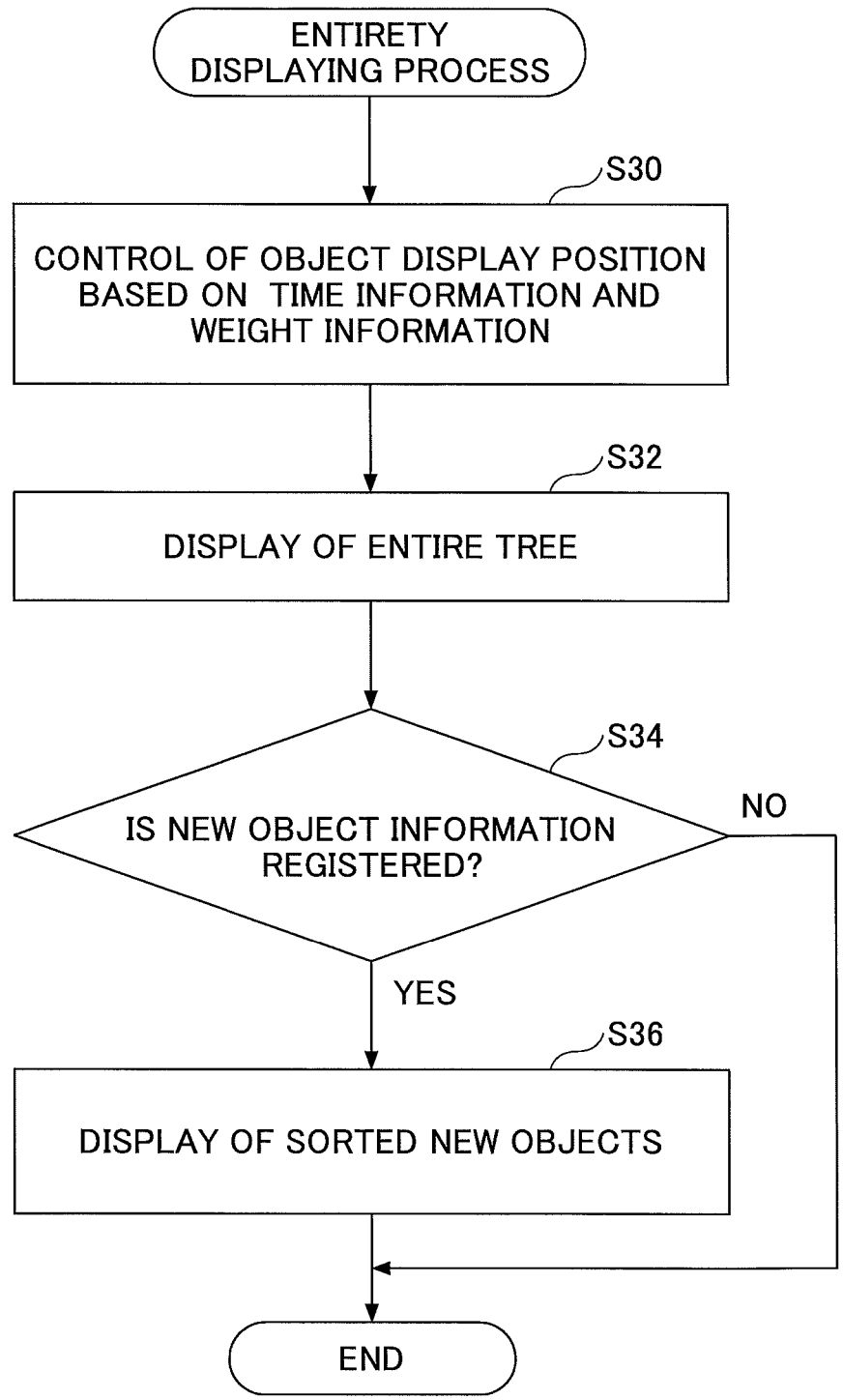
FIG. 9 is a flowchart illustrating an exemplary entirety displaying process of the embodiment.

Next, referring to FIG. 9, an exemplary entirety displaying process of the embodiment is described. FIG. 9 is a flowchart illustrating an exemplary entirety displaying process of the embodiment. Here, a process of displaying many objects indicating records related to the event on a tree displayed on the screen of the display apparatus 60 is exemplified for description.

After starting the entirety displaying process, the display controlling unit 33 controls display positions of the objects based on the time information 326 and the weight information 327, which are associated with the object information, in step S30. An exemplary method of controlling a specific display position is a method illustrated in FIG. 11, a method illustrated in FIG. 12, or the like.

FIG. 11 illustrates a method of controlling the display position on a plane along x and y directions (a position on a plane in a display area) of the object based on the time information 326 in (a), and a method of controlling a display position (an order of displaying in the display area) in z direction (a depth direction) base on the weight information 327 in (b).

Referring to FIG. 11, (a) illustrates an exemplary result of controlling the display position of the object in x and y directions based on the time information 326. Referring to FIG. 11, (b) illustrates an exemplary result of controlling the display position of the object in z direction based on the weight information 327.

The objects 12 designated by "pic A", "pic B", and "pic C" respectively correspond to the object information 322 designated by "pic A", "pic B", and "pic C", which respectively correspond to the image ID 321 designated by "IDA", "IDB", and "IDC" stored in the event information DB 320 illustrated in FIG. 8. According to the time information 326 stored in the event information DB 320, the objects 12 are arranged in an order of "pic B", "pic C", and "pic A" from an old date and hour to a new date and hour.

As illustrated in (a) of FIG. 11, in a case where the display positions of the objects 12 in x and y directions are controlled based on the time information 326, the object 12 having a newer date and hour in the time information 326 is displayed at a position corresponding to a greater value in y direction. Therefore, as the value in y direction comes closer to 0 (zero), the time information 326 of the corresponding object 12 shows an older date and hour. As a result, referring to (a) of FIG. 11, the objects 12 are arranged from the top to the bottom of the screen in the order from the new data and hour to the old date and hour like "pic A", "pic C", and "pic B".

Further, referring to the weight information 327 stored in the event information DB 320, the weight information 327 of the objects 12 is arranged in an order of "pic A", "pic C", and "pic B" from a heavy weight to a light weight.

As illustrated in (b) of FIG. 11, in a case where the display position of the object 12 in z direction is controlled based on the weight information 327, the value along z direction of the object 12 indicating a heavier weight in the weight information 327 comes closer to 0. Therefore, as the value along z direction increases, the weight information 327 of the object 12 becomes light. As a result, referring to (b) of FIG. 11, the objects 12 are displayed in an order of "pic A", "pic C", and "pic B" from the near side to the far side. With this, the object 12 of "pic B" is displayed on a back side of the object 12 of "pic C" while partly overlapping the object 12 of "pic C".

FIG. 12 illustrates a method of controlling the display position on a plane along x and y directions (a position on a plane in the display area) of the object based on the weight information 327 in (a), and a method of controlling the display position (an order of displaying in the display area) in z direction (the depth direction) base in the time information 326.

Referring to FIG. 12, (a) illustrates an exemplary result of controlling the display position of the object in x and y directions based on the weight information 327. Referring to FIG. 12, (b) illustrates an exemplary result of controlling the display position of the object in z direction based on the time information 326.

The objects 12 are arranged in an order of "pic A", "pic C", and "pic B" from a heavy weight to a light weight. As illustrated in (a) of FIG. 12, in a case where the display position of the object 12 in x and y directions is controlled based on the weight information 327, the value along y direction of the object 12 indicating a heavier weight in the weight information 327 becomes greater. Therefore, as the value along y direction comes closer to 0 (zero), the weight information 327 of the object 12 becomes lighter. As a result, referring to (a) of FIG. 12, the objects 12 are arranged from the top to the bottom of the screen in the order from the new data and hour to the old date and hour like "pic A", "pic C", and "pic B".

The time information 326 of the objects 12 is arranged in an order of "pic B", "pic C", and "pic A" from an old date and hour to a new date and hour. As illustrated in (b) of FIG. 12, in a case where the display positions of the objects 12 in z direction are controlled based on the time information 326, the object 12 having a newer date and hour in the time information 326 is displayed at a position corresponding to a greater value in z direction. Therefore, as the value in z direction comes closer to 0 (zero), the time information 326 of the corresponding object 12 shows a newer date and hour. As a result, referring to (b) of FIG. 12, the objects 12 are displayed in an order of "pic A", "pic C", and "pic B" from the near side to the far side. With this, the object 12 of "pic B" is displayed on a back side of the object 12 of "pic C" while partly overlapping the object 12 of "pic C".

As described, the display positions of the objects 12 are controlled by the display controlling unit 33 in x and y directions as an exemplary control of the display positions of the objects in the horizontal direction on the screen. As described, the display positions of the objects 12 are controlled by the display controlling unit 33 in z direction as an exemplary control of the display positions of the objects in the depth direction (the vertical direction on the screen) on the screen.

The method of controlling the display position of the object is not limited to the methods illustrated in FIGS. 11 and 12. For example, the method may be such that the value in y direction of the object 12 is made smaller (set at a lower position) instead of being made greater (setting at a higher position) as the weight information 327 is heavier. Or, the method may be such that the objects 12 are arranged in an order from a heavy weight to a light weight in a spiral shape (the object 12 having heavier weight information 327 is positioned closer to the center on one plane along x and y directions). Further, for example, an evaluation value (evaluation information) combining the time information 326 and the weight information 327 may be used. For this, an evaluation parameter is obtained by changing the time information so that the value of the evaluation parameter decreases as the time (the date and hour) of the object 12 changes from a new date and hour to an old date and hour. An evaluation value for determining the display position is calculated by multiplying the evaluation parameter by the value of the weight information 327. The object 12 having a greater evaluation value may be positioned at a nearer side (at a position whose value in z direction is smaller). As to the objects on a same plane, namely the objects whose display positions in z direction is the same, the object having a greater evaluation value is displayed at a higher position where the value in y direction is greater. In this case, if the number of the objects 12 is associated with arranged positions and a priority order of the objects 12, the display positions of the objects 12 can be controlled using the above evaluation value for determining the display position. It can be previously determined which method of controlling the display position is used.

Figure 10:
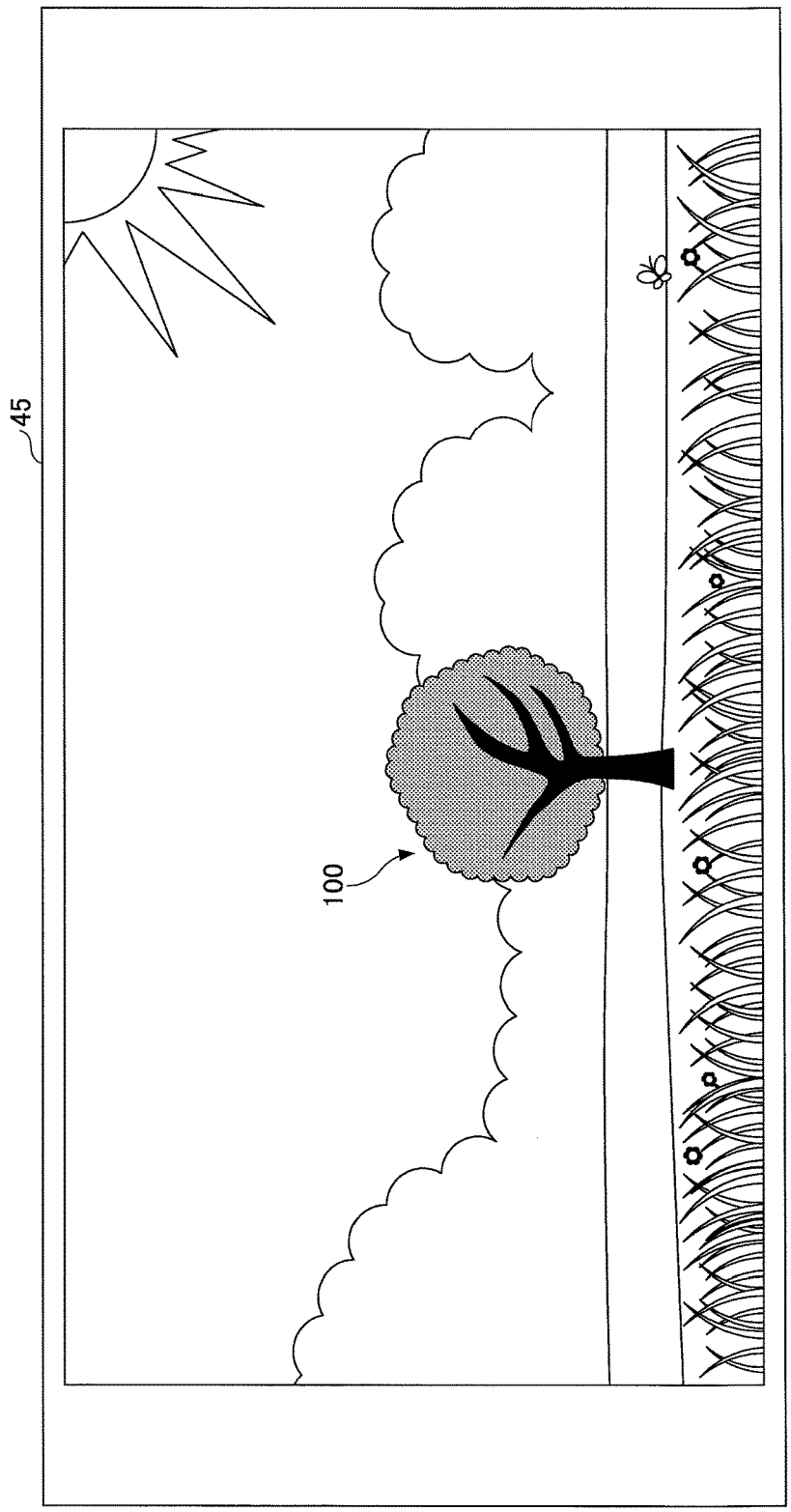
FIG. 10 illustrates an exemplary display screen of the embodiment.

Referring back to FIG. 9, after the display positions of the multiple objects 12 registered in the event information DB 320 are controlled, the display controlling unit 33 displays the entire tree in step S32. The display of the tree 100 is changed from a state where the object illustrated in FIG. 10 is not displayed to a state where many objects 12 are displayed as illustrated at the upper right of FIG. 7. The objects 12 whose display positions are controlled as described above are arranged on the tree 100 in up and down directions, right and left directions, and diagonal directions and overlap like leaves.

The tree 100 is an example of a support object (a second object) displayed so as to support the objects 12 (a first object) on the screen. The support object may be other than the tree 100. The display size of the support object covers the display of the multiple objects 12.

Therefore, the support object determines a display area for displaying (arranging) at least one object on the screen. The objects 12 are arranged within the display area of the support object. However, if the positions of arranging the objects 12 are controlled using the center points of the objects and the center point of the certain object 12 is arranged at an outer periphery of the support object, the outer periphery of the certain object 12 may protrude from the display area of the support object. Therefore, the area where the object is displayed may include a vicinity of the display area of the support object. Hereinafter, the display area includes the vicinity of the display area of the support object.

The display controlling unit 33 displays the entire tree 100, and thereafter determines whether new object information is registered in the event information DB 320 in step S34. If it is determined that the new object information is not registered, the entirety displaying process ends.

On the other hand, if it is determined that the new object information is registered, the display controlling unit 33 controls a display position of the object based on the new object information. The display position of the new object is calculated based on the process of step S30. The display controlling unit 33 displays the new object on the display position of the new object and integrates the new object into the objects 12, which is already displayed, so as to be rearranged (sorted) in step S36. Thus, the entirety displaying process ends.

As described, in the entirety displaying process of the embodiment, the objects 12 each displayed in a form of a "thought card" are displayed on the support object that is shaped like the tree 100 and projected on a large screen to share the thoughts of the associate participants. Thus, it is possible to render a display where the thought cards gather at the tree.

At this time, the display position of the object displaying a photograph or the like of the registered associate participant is controlled based on the time information 326 and the weight information 327, each associated with each object information, in the vertical direction and the depth direction of the screen. With this, visibility of the object having a high priority order for the associate participants of the event or visibility of the object that is recently registered for the associate participants is supposed to be higher and is displayed at a position easily watched by the associate participants. With this, the object on which the record related to the event is shown can be effectively displayed on the screen. Further, the associate participants can share the thoughts of the associate participants in the event where many people participate when the associate participants browse the objects displayed on the screen.

Especially, the object 12 on which an image of a famous artist is displayed (hereinafter, a "celebrity card") is displayed at a position where the associate participants can most easily watch. With this, a probability for the associate participants of earlier reaching the object required by the associate participants to watch becomes higher. For example, within the embodiment, the weight information 327, a frame color 352, and a frame type 353 each of the object 12 are stored in a predetermined display table 350 as illustrated in (b) of FIG. 8. Based on the weight information 327 of the object 12 registered in the event information DB 320, the frame color 352 or the frame type 353 is changed. For example, in the event information DB 320, it is possible to register an infinite weight for the weight information associated with the object information showing an image of a prominent artist. With this, the display controlling unit 33 displays the frame of the object 12 being the celebrity card having the infinite weight based on the display table 350 using a golden color and adopts the frame type for celebrity for this object 12 being the celebrity card. On the other hand, if weight information of "100" is registered in the weight information 327 associated with the object information of an ordinary associate participant, the display controlling unit 33 displays the frame of the object 12 having the weight information of "100" using a silver color, and adopts the frame type for ordinary people for this object 12. For example, the object information "pic A" illustrated in FIGS. 11 and 12 is displayed as the celebrity card whose frame has the golden color, the object information "pic B" illustrated in FIGS. 11 and 12 is displayed as an ordinary card whose frame has a copper color, and the object information "pic C" illustrated in FIGS. 11 and 12 is displayed as the ordinary card whose frame has a silver color. As described, in addition to the display position of the object 12, a mode of displaying the object 12 can be changed based on the weight information 327. The celebrity card may be rendered so that the celebrity card can be easily found by the associate participants. This rendition of the celebrity card is in a displayed color, a shape, and glitter, and is different from that of the thought card. With this, on the side of the event promoter, the rendition of the display can be improved by using the object 12 being the celebrity card for a famous person in addition to the objects 12 being the ordinary cards.

In the above description, the object 12 being the celebrity card is displayed at a position easily watched in comparison with the objects for the associate participants by setting the weight information 327 of the object 12 being the celebrity card to be infinite. However, the display control of the object being the celebrity card is not limited to this. For example, by setting the time information 326 to a predetermined special time, the display of the object 12 being the celebrity card can be controlled.

Figure 13:
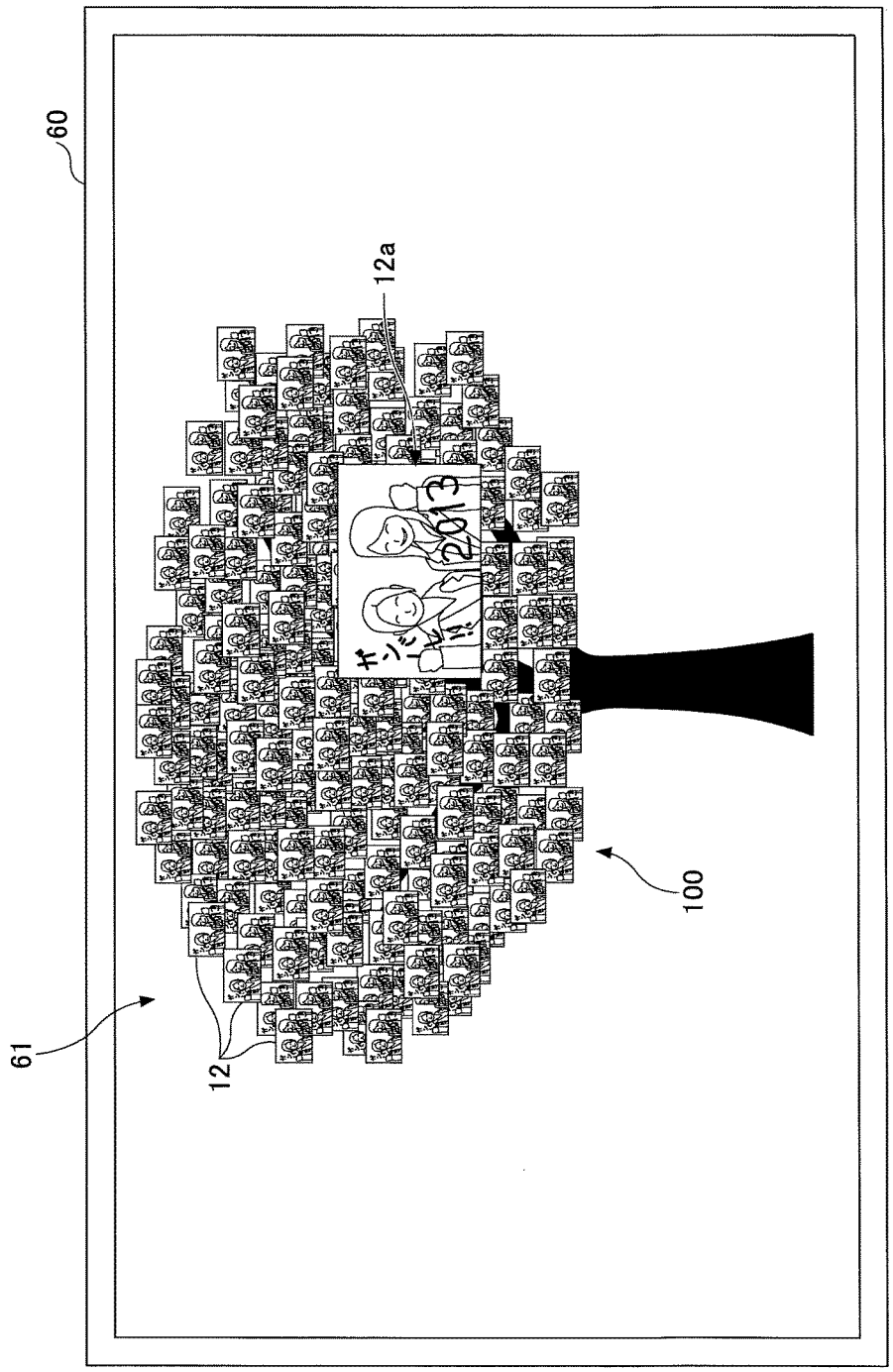
FIG. 13 illustrates an exemplary display screen of the embodiment.

Further, in a case where a new photograph or a new message of the event is newly registered, an object showing the new photograph or the like is integrated into the objects which are already displayed, rearranged (sorted), and displayed. At this time the object to be sorted may be rendered so as to be zoomed out from a zoom-in state while the object 12 is sorted to be settled in a required display position. Referring to FIG. 13, as an example of the rendition of enhancing the visibility (attracting attention) of the associate participants, the sorted new object 12a is displayed in a zoom-in state for a predetermined time. After a passage of the predetermined time, the new object 12a is zoomed out to be the same size as the object 12, which is already displayed.

Further, the rendition of the display on the screen may be changed depending on the number of the objects being the thought cards displayed on the tree. As illustrated in (c) of FIG. 8, a tree number 371 indicative of a display size of the tree 100 and the number of the cards 372 displayed on the screen are stored in a card number table 370. The calculating unit 34 adds "1" to the number of the cards 34 every registration of the new object and display of the new object.

Figure 14:
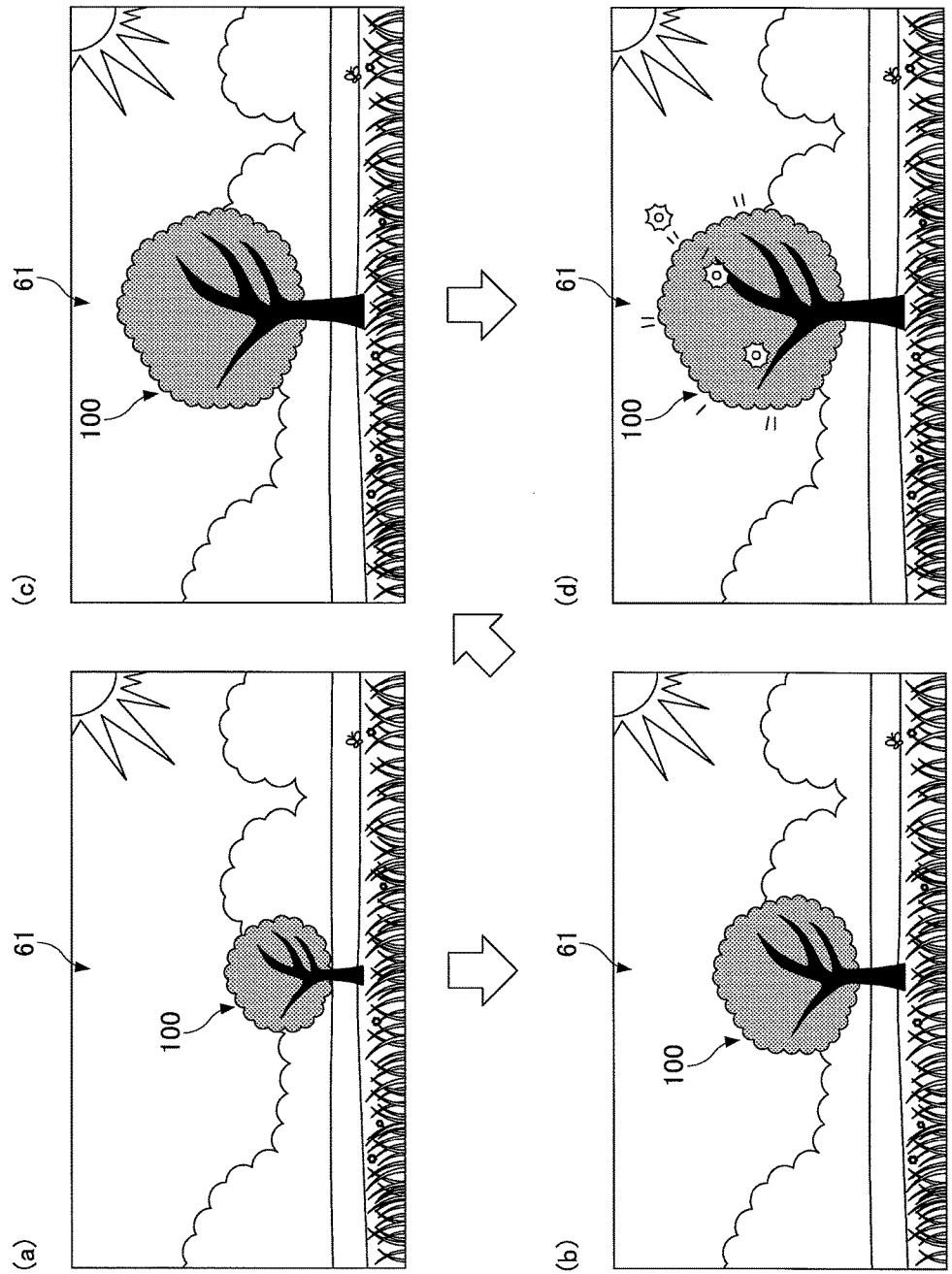
FIG. 14 illustrates a transition of exemplary display screens of the embodiment.

Based on the tree number 371 corresponding to the number of cards 372 that indicates the number of the objects 12 displayed on the screen of the display apparatus 60, the size of displaying the tree is changed. In a case where the number of the objects 12 on the screen is equal to or less than 500, the smallest tree corresponding to "1" of the tree number 371 is displayed. In a case where the number of the objects 12 on the screen is equal to or greater than 501, a tree having a tree size corresponding to "2" of the tree number 371 is displayed. As such, as illustrated in (a) to (c) of FIG. 14, the size of the tree 100 displayed on the screen 61 may be gradually increased. Further, if the number of the objects 12 is equal to or greater than 200, as illustrated in (d) of FIG. 14, the tree 100 having a gorgeous design may be displayed. Referring to FIG. 14, the objects 12 are omitted and are not displayed for convenience.

Further, a slide show of the displayed objects may be performed. For example, if an instruction signal including information of serial numbers of the objects 12 subjected to the slide show is output from the notebook PC 40 illustrated in FIG. 1, the slide show may be started for the object on the screen of the display apparatus 60.

By using the rendition enabling many people participating in the event to share and bring up their thoughts, the objects having records related to the event can further be effectively displayed on the screen.

[Searching and Displaying Process]

Figure 15A:
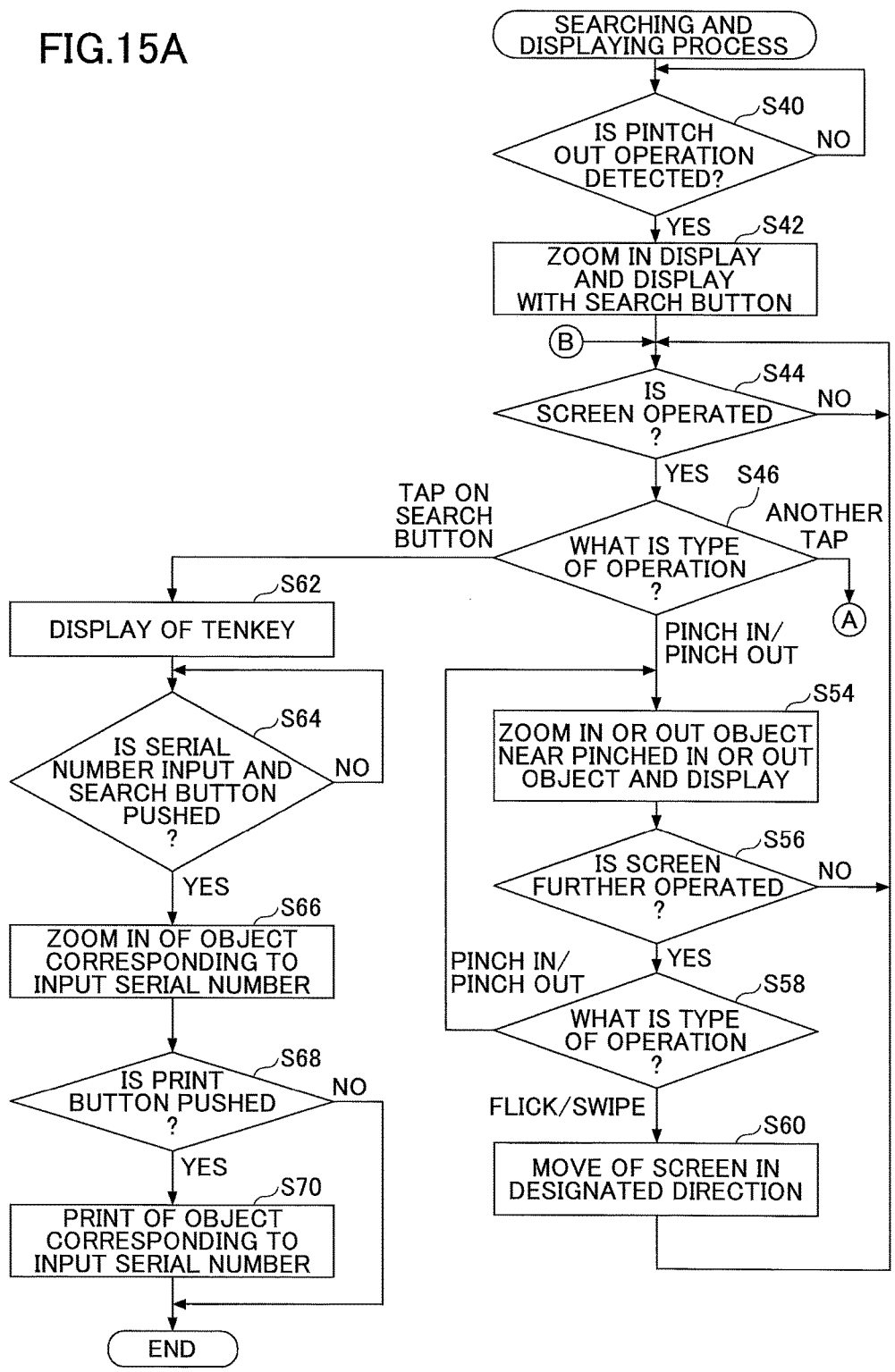
FIG. 15A is a flowchart illustrating an exemplary searching and displaying process of the embodiment.
Figure 15B:
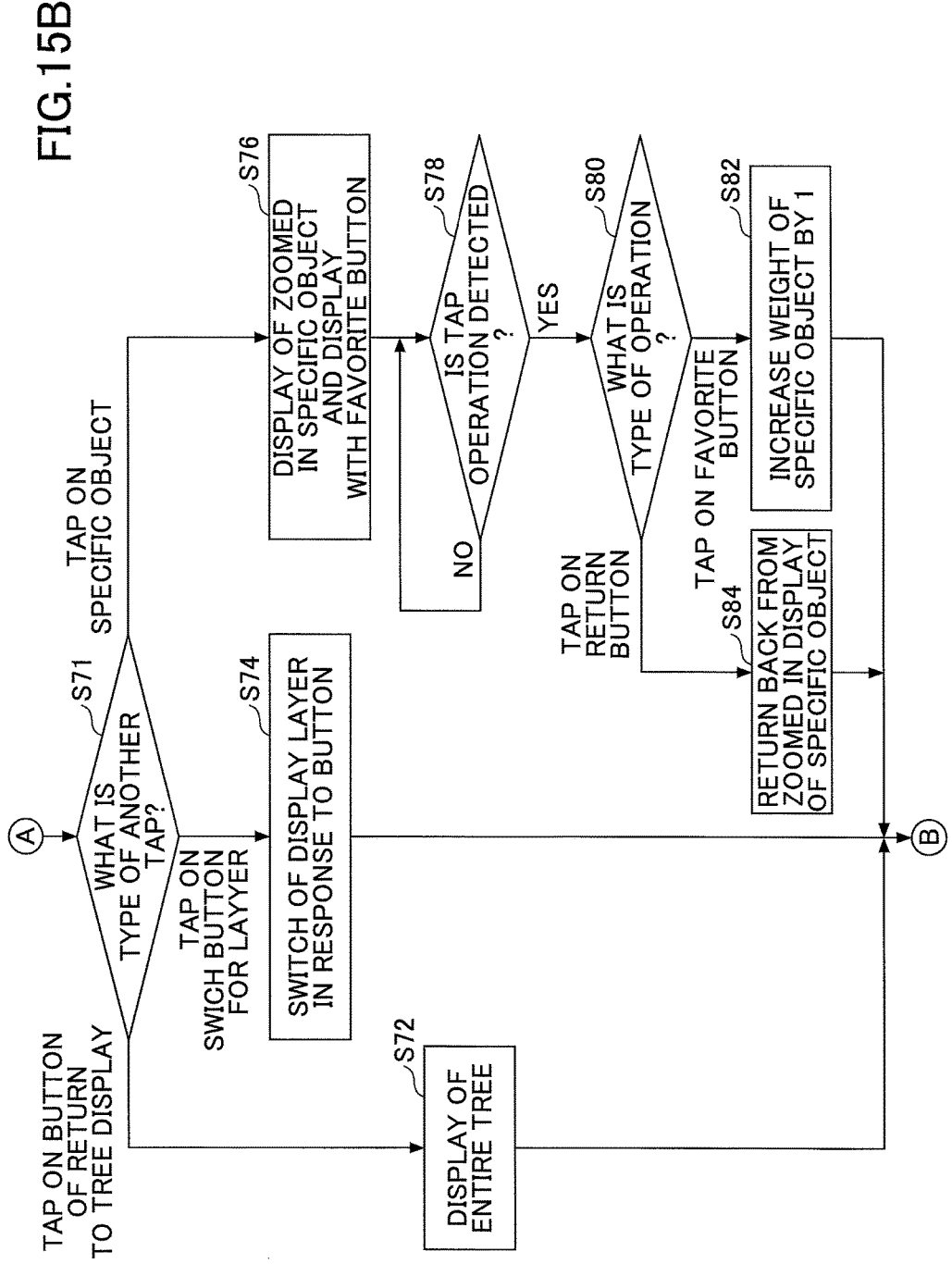
FIG. 15B is a flowchart illustrating the exemplary searching and displaying process of the embodiment.

Next, an exemplary searching and displaying process of the embodiment is explained with reference to FIGS. 15A and 15B. FIGS. 15A and 15B are flowcharts illustrating the exemplary searching and displaying process of the embodiment.

After the searching and displaying process is started, the display controlling unit 33 determines whether a pinch-out operation is detected in step S40. The pinch-out operation is performed by placing two fingers on the screen and opening a gap between the two fingers. Said differently, the pinch-out operation is a state where it is determined that a distance between the two touching points increases while two touching points are detected. Step S40 is repeated until the pinch-out operation is detected. In a case where the pinch-out operation is detected, the display controlling unit 33 zooms in and displays the image and further display the screen including a search button in step S42. With this, by zooming in a predetermined display position, the associate participant can easily check the object 12 which the associate participant wishes to browse and peripheral objects 12 in the vicinity of the object 12.

Although the pinch-out operation is described, a pinch-in operation inverse to the pinch-out operation can be processed in a manner similar thereto. The pinch-in operation is performed by placing two fingers on the screen and closing a gap between the two fingers. When it is determined that the distance between the two touching points decreases while the two touching points are detected, the pinch-in operation is determined and the image is zoomed out and displayed. Both of the pinch-out operation and the pinch-in operation are expressed or performed intuitively or artificially to thereby facilitate a user operation. However, the user operation is not limited to the intuitive expression and may be performed by selecting a button to zoom in or out.

Next, the display controlling unit 33 determines whether the screen is operated. Step S44 is repeated until the screen is operated. If the screen is operated, the display controlling unit 33 determines a type of the operation in step S46.

In a case where the type of the operation is (1) pinch in/pinch out, a process on or after step S54 is performed. In a case where the type of the operation is a tap on a "search" button, a process on or after step S62 is performed. In a case where the type of the operation is another tap (namely, a tap on a button of "a return to tree", a tap on switch button for "switching a layer", or a tap on a specific object), the process illustrated in FIG. 15B is performed. Hereinafter, the cases (1) to (3) are sequentially explained.

(1) Case of "Pinch in/Pinch Out"

Figure 16A:
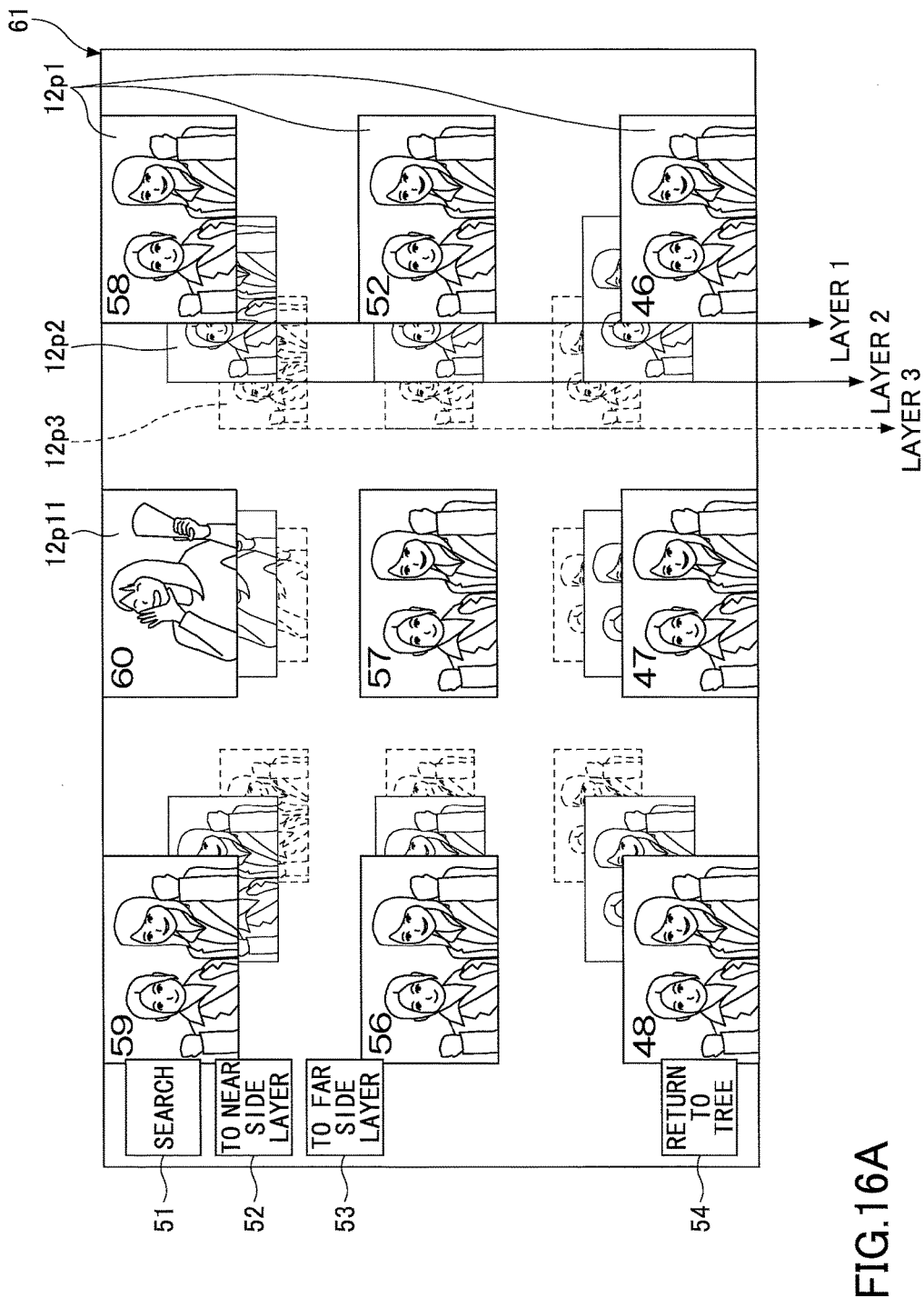
FIG. 16A illustrates an exemplary searched display screen of the embodiment.

In a case where the pinch in or the pinch out is performed, the display controlling unit 33 zooms in or out the objects 12 around a position where the pinch in or the pinch out is performed and displays in step S54. FIG. 16A illustrates a state where the image at a predetermined position is zoomed in by a pinch-out operation and thereafter various buttons such as a search button 51 or the like is displayed.

The objects have a layered structure in the depth direction. The layers have a surface extending along x and y directions and arranged in z direction to form a layered structure. For example, referring to FIG. 16A, three layers of a layer 1, a layer 2, and a layer 3 are displayed from the near side to the far side in z direction. However, the other layers exist on the near side of layer 1 and over the far side of the layer 3. It is possible to change the position of the displayed layer in response to the pinch-in operation or the pinch-out operation of the user.

In a case where z direction corresponds to the time information, the images on the same layers are objects recorded at substantially the same time. For example, multiple objects 12p1 included in the layer 1 are recorded at substantially the same time. The image on the layer positioned farther toward z direction is recorded at older time than in the image on the layer positioned nearer. In an order of the layer 1, the layer 2, and the layer 3, the images are from newer to older.

In a case where z direction corresponds to the weight information, the images on the same layers are objects having substantially the same weight. For example, the weight information of the objects on the layer 1 is 0 to 10, the weight information of the objects on the layer 2 is 11 to 20, and the weight information of the objects on the layer 3 is 21 to 30. Based on the weight information, the layer having a heavier weight is displayed on a nearer side of the layer having a lighter weight.

Referring back to FIG. 15A, the display controlling unit 33 determines whether the screen which is zoomed in or out is further operated in step S56. In a case where the display controlling unit 33 determines that the screen which is zoomed in or out is not further operated, the process returns to step S44. In a case where the display controlling unit 33 determines that the screen which is zoomed in or out is further operated, the type of the operation of the screen operation is determined again in step S58. In a case where the pinch in or the pinch out is performed, the process returns to step S54 and the display controlling unit 33 zooms in or out the objects 12 around the position where the pinch in or the pinch out is performed and displays. In a case where a flick or a swipe is operated, the display controlling unit 33 moves the screen in a direction of the flick or the swipe in step S60 and returns to the process of step S44. With this, in response to the operation by the associate participant of the pinch in, the pinch out, the flick, or the swipe, the object 12 on the screen can be zoomed in, zoomed out, or moved in an up or down direction, a right or left direction, or a forward or backward direction.

(2) Case of Tap on "Search" Button

Figure 17:
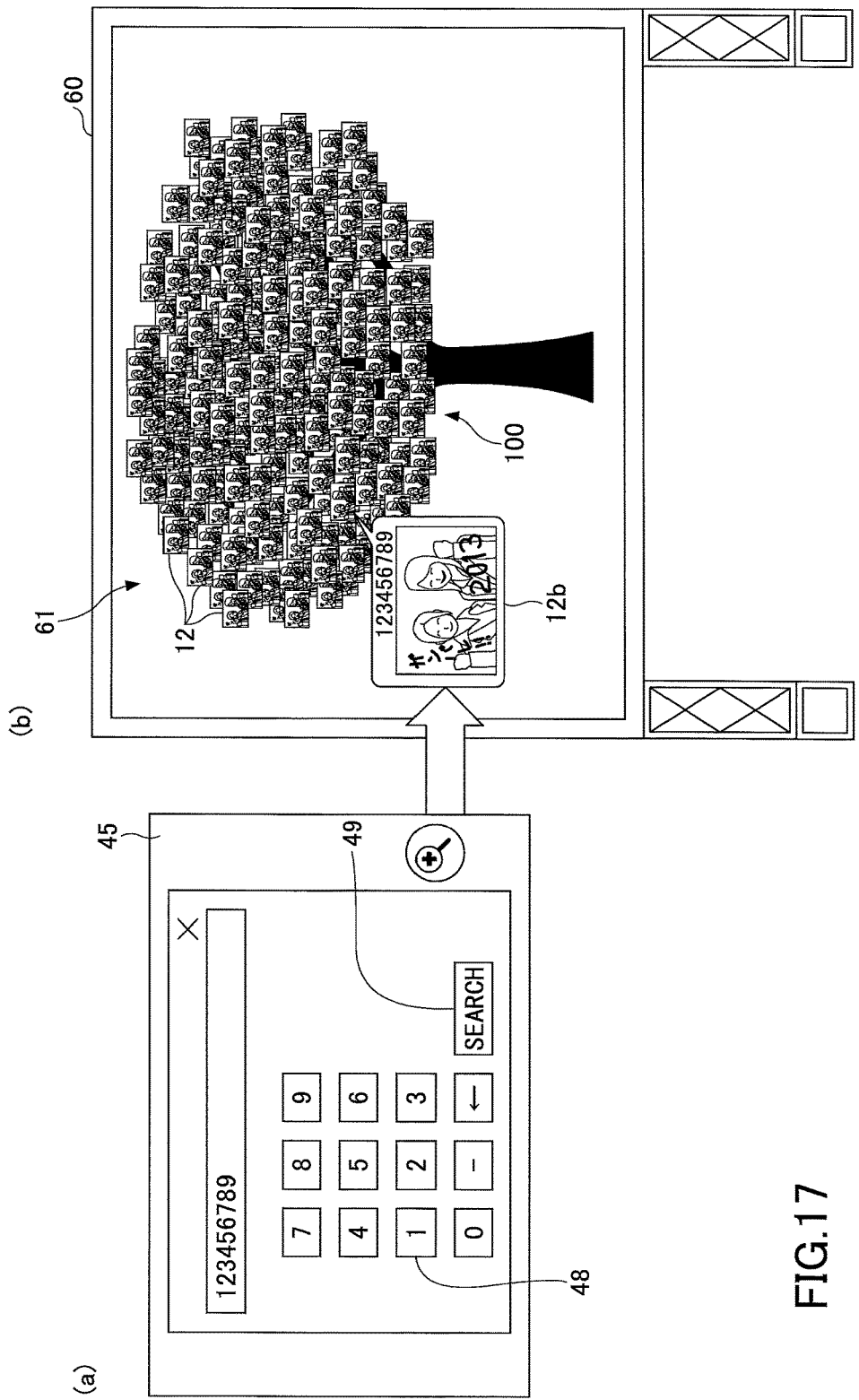
FIG. 17 illustrates another exemplary searched display screen of the embodiment.

If the "search" button 51 (see FIG. 16A) is tapped (touched) in step S46, the display controlling unit 33 displays a ten key 48 on the screen as illustrated in, for example, (a) of FIG. 17 in step S62. The display controlling unit 33 determines whether the serial number of the object is input by the associate participant using the ten key 48 and the search button 49 is pushed in step S64.

When the search button 49 is pushed, the display controlling unit 33 zooms in the object 12 corresponding to the input serial number and displays the zoomed in object on the screen 61 of the display apparatus 60 in step S66. Referring to (b) of FIG. 17, the object 12b of the thought card corresponding to the input serial number. Next, the display controlling unit 33 determines whether a print button is pushed in step S68. When the print button is not pushed, the searching and displaying process ends. In a case where the print button is determined to be pushed, the display controlling unit 33 prints the object corresponding to the input serial number in step S70, and the searching and displaying process ends. With this, for example, the object 12b applied with the serial number as illustrated in (b) of FIG. 17 is printed. With this, it is possible to permit only who knows the serial number such as the associate participant himself or herself and another associate participant familiar with the associate participant himself or herself to print the image data of the associate participant. The input serial number is an example of the identification information.

(3) Case of Another Tap

In a case where another tap is displayed in step S46, the process illustrated in FIG. 15B is performed. Specifically, the display controlling unit 33 determines a type of the other tap in step S71. As the result of the determination, the following processes (3-1), (3-2), or (3-3) is performed.

(3-1) Case of Tapping on Button of "Return to Tree Display"

When the button 54 of "return to tree" illustrated in FIG. 6A is tapped by the user operation, the display controlling unit 33 displays the entire tree in step S72, and thereafter returns to the step S44 illustrated in FIG. 15A. Therefore, the entire tree illustrated in FIG. 7 is displayed.

(3-2) Case of Tapping on Switch Button for Switching Layer

When the layer switch button 52 or 53 illustrated in FIG. 6A is tapped by the user operation, the display controlling unit 33 displays the display layer in response to the layer switch button 52 or 53 in step S72, and thereafter returns to the step S44 illustrated in FIG. 15A. When the button 52 of "to near side layer" illustrated in FIG. 16A is pushed by the user operation, the display moves to the immediately near side layer. For example, when the button 52 of "to near side layer" is pushed while the objects are displayed as illustrated in FIG. 16A, the layers move so that the layer on an immediately near side of the layer 1 is displayed on the nearest side and the layers 1,2, and 3 are moved on an immediately far side and displayed. When the button 53 of "to far side layer" is pushed in the display state illustrated in FIG. 16A, the layers are moved so that layer 2 is displayed on the nearest side.

(3-3) Case of Tapping on Specific Object

In a case where the specific object is tapped by the user operation, the display controlling unit 33 zooms in only the specific object and performs a display including a favorite button in step S76. For example, the object 12*p*11 displayed on the layer 1 in the display screen illustrated in FIG. 16A is tapped on, as illustrated in FIG. 16B, the object 12*p*11 is zoomed in and a display including the favorite button 56 is displayed.

Next, the display controlling unit 33 determines whether a tap operation is detected in step S78. Step S78 is repeated until the tap operation is detected. If the tap operation is detected, the display controlling unit 33 determines a type of the operation in step S80.

In a case where the favorite button 56 is determined to be tapped in step S80, the value of the weight information of the specific object is increased by 1 in step S82. Thereafter, the process returns to step S44 in FIG. 15A. For example, when the specific object 12*p*11 is tapped on and then the favorite button 56 is tapped as illustrated in FIG. 16B, the value of the weight information of the specific object 12*p*11 is added by 1. With this, it is possible to customize the weight of the specific object.

Figure 16B:
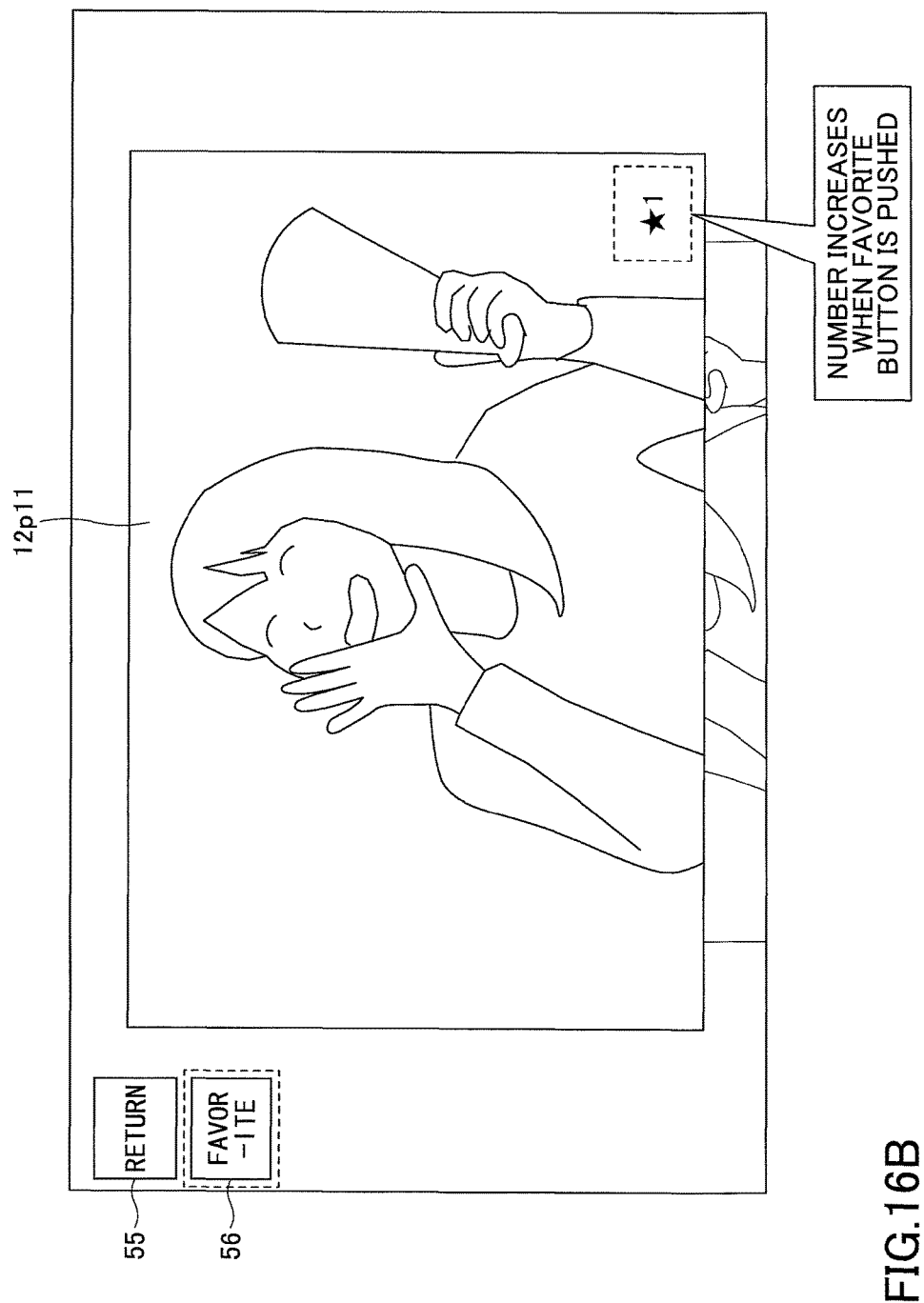
FIG. 16B illustrates another exemplary searched display screen of the embodiment.

On the other hand, in a case where a "return" button 55 illustrated in FIG. 16B is determined to be tapped on, the display controlling unit 33 returns the zoomed-in state of the specific object to the original state in step S84.

With this, the object on which the record related to the event is shown can be effectively displayed on the screen.

Within the embodiment, buttons 52 and 53 for switching over the layers are displayed. By displaying these buttons, the display of the object in z direction is controlled. However, the layers can be switched over by a pinch-in or pinch-out operation. For example, the size of the layer becomes equal to or greater than a predetermined size by the pinch-out operation, the layer is moved to a far side layer. For example, the size of the layer becomes equal to or smaller than the predetermined size by the pinch-in operation, the layer is moved to a near side layer.

Figure 18:
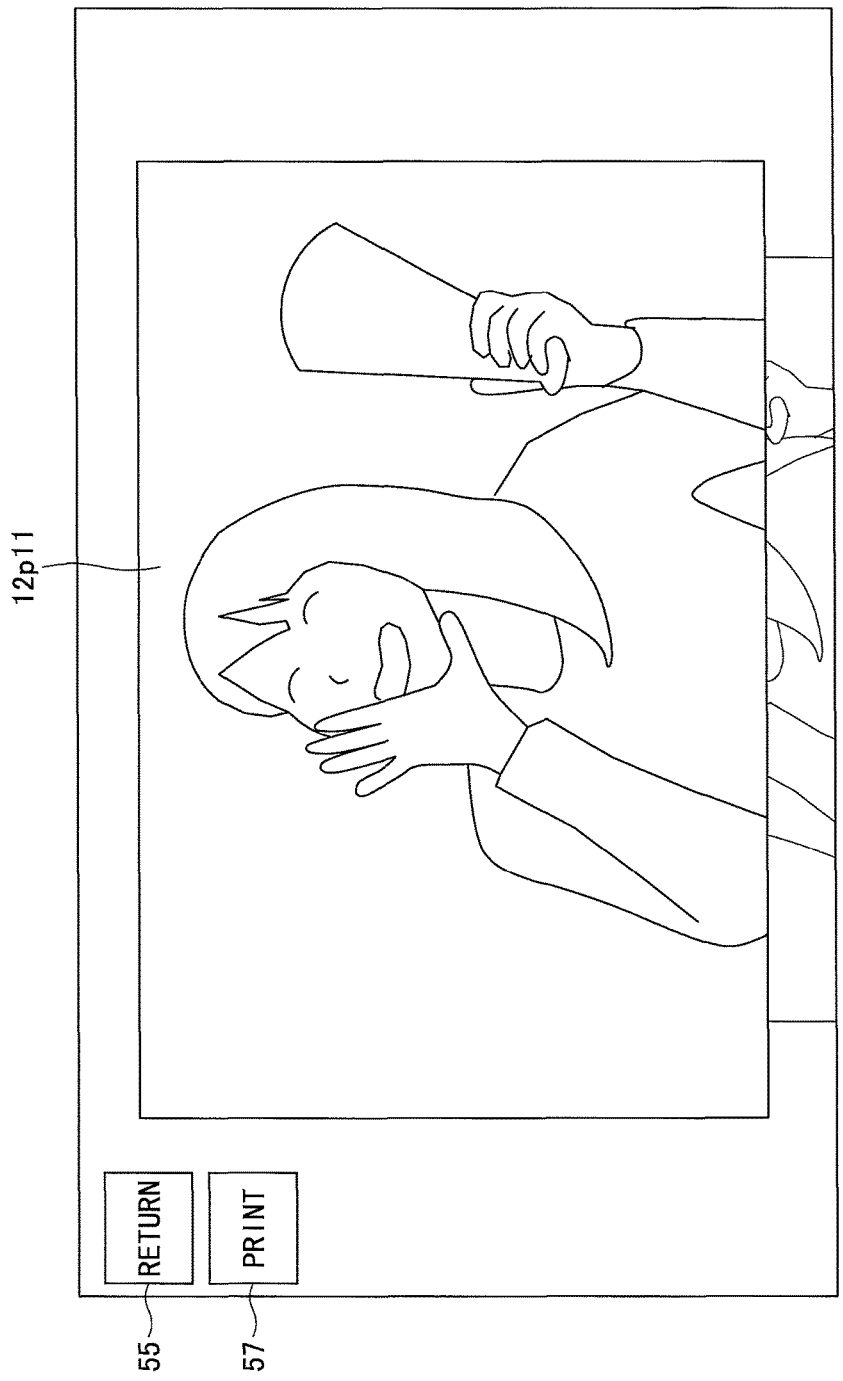
FIG. 18 illustrates another exemplary searched display screen of the embodiment.

Further, when a "print" button is operated on a screen illustrated in FIG. 18 after the display controlling unit 33 detects a tap operation in step S78, the specific object 12*p*11 of FIG. 18 may be printed.

[Modified Example of Entirety Displaying Process]

Figure 19:
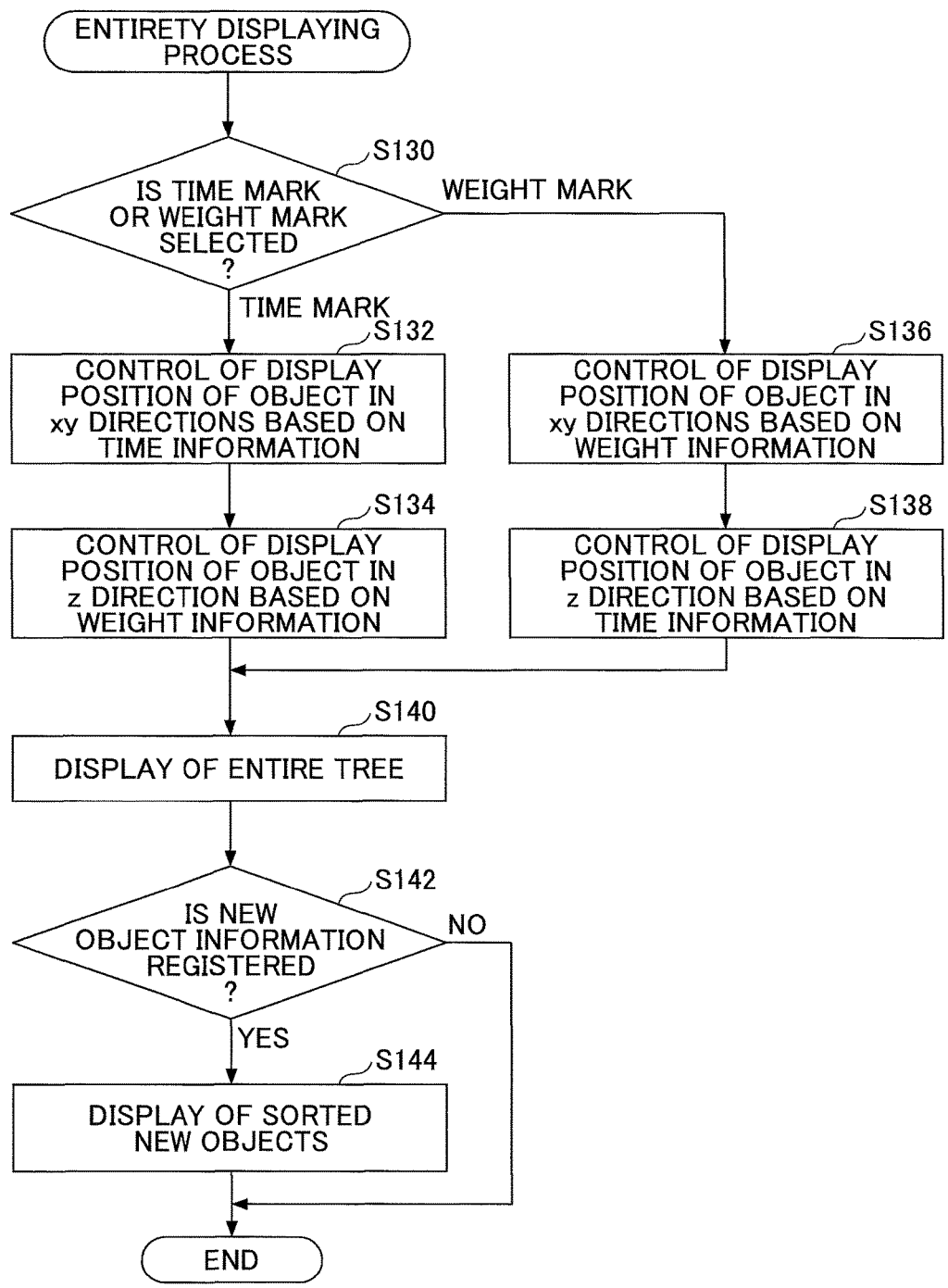
FIG. 19 is a flowchart illustrating an exemplary entirety displaying process of the embodiment.

Next, referring to FIG. 19, an exemplary entirety displaying process of the embodiment is described. FIG. 19 is a flowchart illustrating an exemplary entirety displaying process of the embodiment. Here, a process of displaying many objects indicating records related to the event on the tree 100 displayed on the screen of the display apparatus 60 is exemplified for description.

Figure 20:
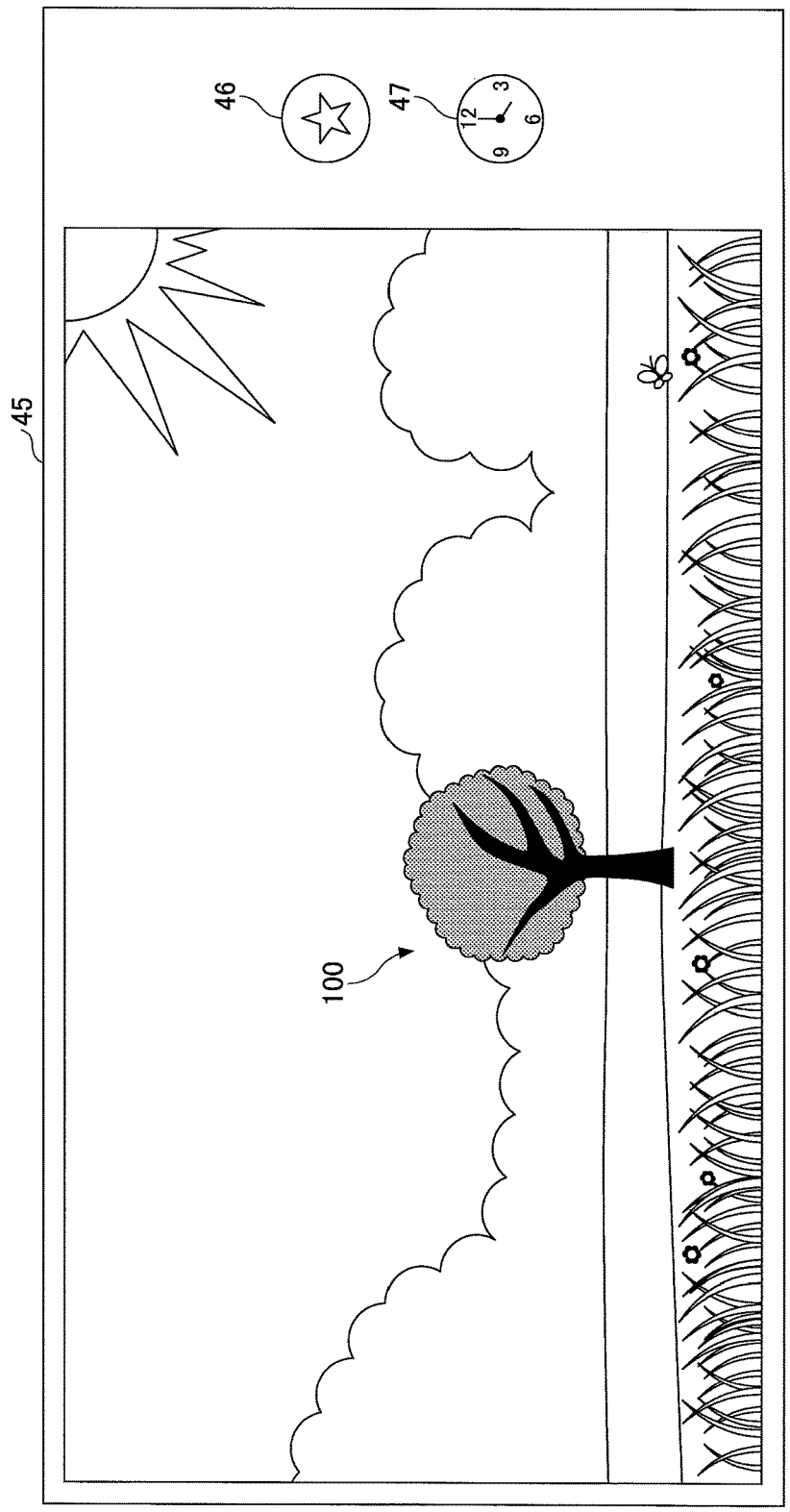
FIG. 20 illustrates another exemplary display screen of the embodiment.

When the entirety displaying process is started, the display controlling unit 33 determined whether a weight mark or a time mark is selected on a screen in step S130. Referring to FIG. 20, the tree 100 for displaying the objects is displayed on the screen of the tablet terminal 45. The weight mark 46 and the time mark 47 are displayed on the right side of the screen. For example, the associate participant touches the time mark 47, and the display controlling unit 33 determines that "time" is selected. In this case, the display controlling unit 33 controls the display position of the object in x and y directions based on the time information 326 in step S132, and controls the display position of the object in z direction based on the weight information 327 in step S134. Because the method of controlling the display position of the object is described with reference to FIGS. 11 and 12, the description is omitted.

When the weight mark 46 illustrated in FIG. 20 is touched by the associate participant, it is determined that the "weight" is selected in step S130 of FIG. 19. In this case, the display controlling unit 33 controls the display position of the object in x and y directions based on the weight information 327 in step S136, and controls the display position of the object in z direction based on the time information 326 in step S138.

Referring back to FIG. 19, after the display positions of the multiple objects 12 registered in the event information DB 320 are controlled, the display controlling unit 33 displays the entire tree in step S140. Referring to the right side of FIG. 7, the entire tree 100 is displayed on the screen 61 of the display apparatus 60. The objects 12 whose display positions are controlled as described above are arranged on the tree 100 in up and down directions, right and left directions, and diagonal directions and overlap like leaves.

The tree is an example of a support object which is displayed so as to support the objects on the screen. The support object may be other than the tree 100. The display size of the support object covers the display of the multiple objects 12.

The display controlling unit 33 displays the entire tree 100, and thereafter determines whether new object information is registered in the event information DB 320 in step S142. If it is determined that the new object information is not registered, the entirety displaying process ends.

On the other hand, if it is determined that the new object information is registered, the display controlling unit 33 controls a display position of the object based on the new object information. The display position of the new object is calculated by performing a display control process of steps S132 and S134 or a display control process of steps S136 and S138 based on a selection process of step S130. The display controlling unit 33 displays the new object on the display position of the new object and integrates the new object into the objects 12, which is already displayed, so as to be rearranged (sorted) in step S144. Thus, the entirety displaying process ends.

As described, in the modified example of the entirety displaying process of the embodiment, the objects 12 each displayed in the form of the "thought card" are displayed on the support object that is shaped like the tree 100 and projected on the large screen to share the thoughts of the associate participants. Thus, it is possible to render the display where the thought cards gather at the tree 100.

[Modified Example of Searching and Displaying Process]

Figure 21:
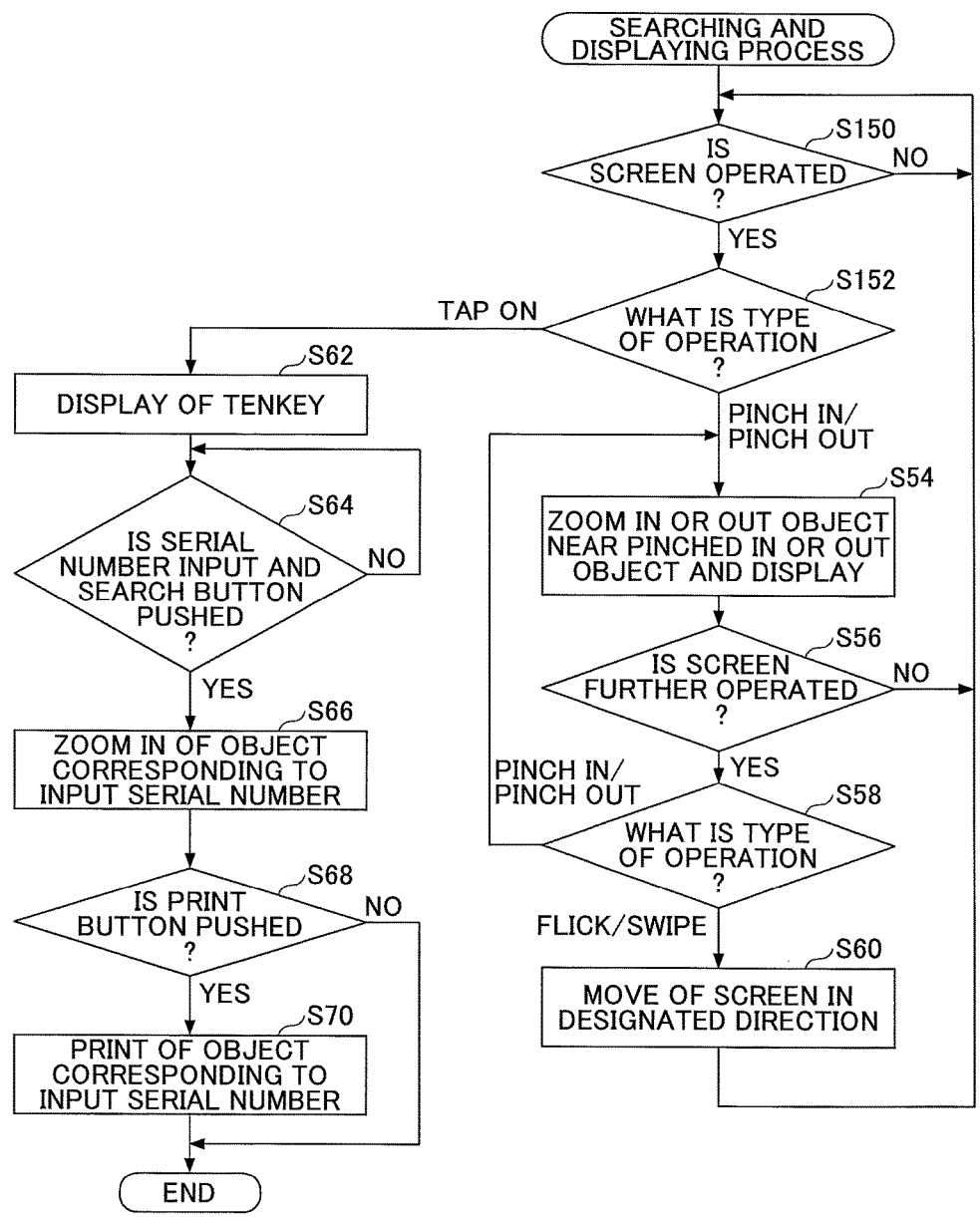
FIG. 21 is a flowchart illustrating another exemplary searching and displaying process of the embodiment.

Next, referring to FIG. 21, a modified example of a searching and displaying process of the embodiment is described. FIG. 21 is a flowchart illustrating the modified example of the searching and displaying process of the embodiment. Here, a process of searching a specific object from many objects displayed on the tree on the screen of the display apparatus 60 is exemplified for description.

After this searching and displaying process is started, the display controlling unit determines whether the screen is operated in step S150. The determination process of step S150 is repeated until the screen is operated. In a case where the screen is operated, the type of a screen operation is determined in step S152. The screen operation by the associate participant or the administrator may use an apparatus dedicated for searching the object such as the tablet terminal 45 or an information terminal such as a notebook PC 40 or a PC (not illustrated).

When the screen operation is determined to be the "pinch in/pinch out" operation, the processes of steps S54 to S60 are performed. Because the process of steps S54 to S60 are as descried in the process of steps S54 to S60 of FIG. 15A, the description of the process is omitted.

In a case where a "search" button is determined to be tapped, a process of steps S62 to S70 is performed. Because the processes of steps S62 to S70 are as descried in the process of steps S62 to S70 of FIG. 15A, the description of the process is omitted.

As described above, according to the display control system 1 of the embodiment, the object on which the record related to the event is shown can be effectively displayed on the screen. With this, it is possible to share the thoughts between the associate participants especially in an event where many people participate.

Further, the calculating unit 34 may increase the weight indicated by the weight information 327 of the object in response to a touch operation (a tap operation) by the associate participant to the object displayed on the screen. With this, the object can be displayed at a position where the object can be easily watched with priority in response to the touch operation by the associate participant.

(Exemplary Hardware Structure)

Figure 22:
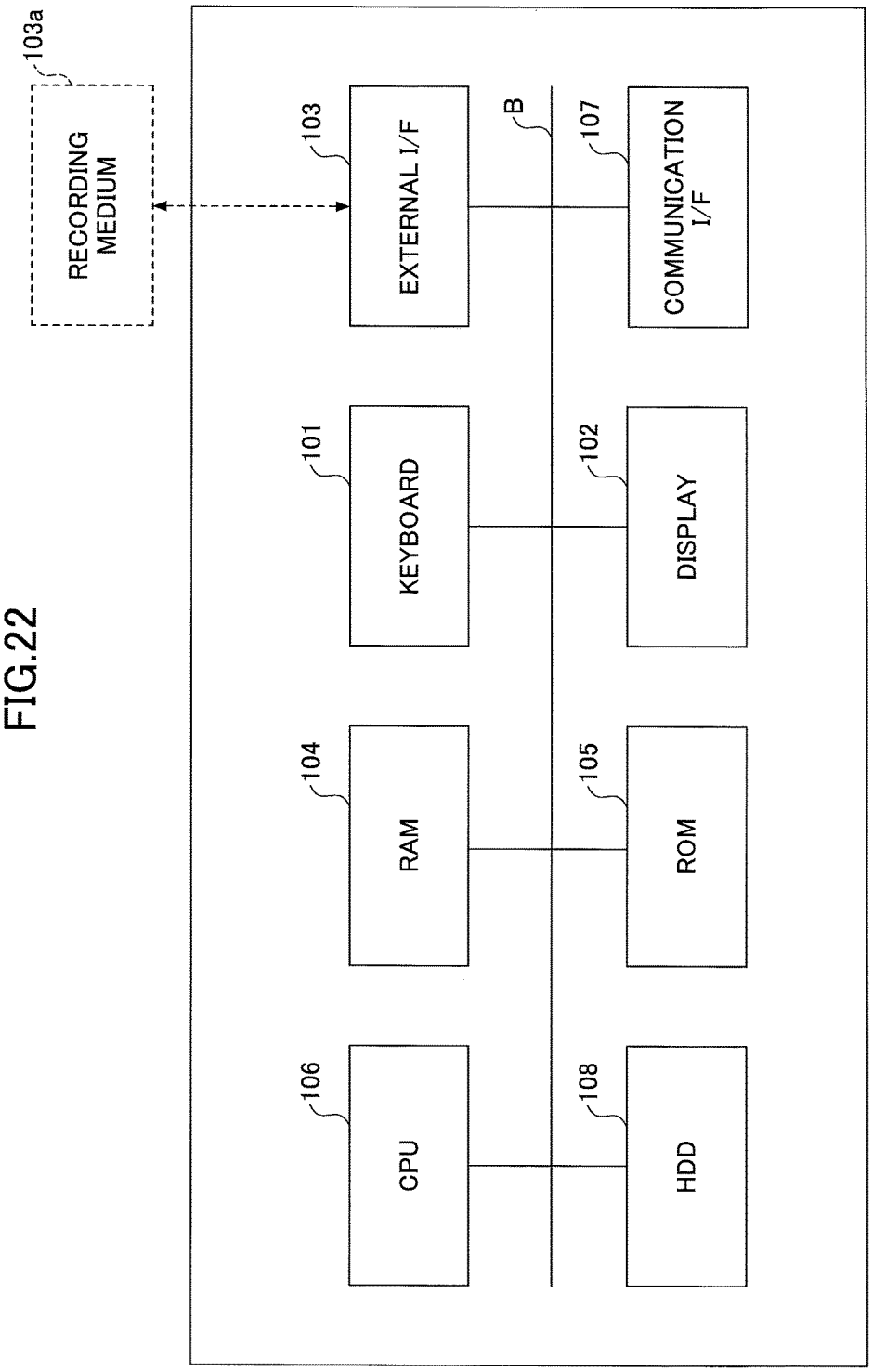
FIG. 22 illustrates an exemplary hardware structure of a server of the embodiment.

Finally, an exemplary hardware structure of the server 30 of the embodiment is described. FIG. 22 illustrates the exemplary hardware structure of the server 30 of the embodiment. The server 30 includes a keyboard 101, a display 102, an external I/F, a random access memory (RAM) 104, a read only memory (ROM) 105, a central processing unit (CPU) 106, a communication I/F 107, and a hard disk drive (HDD) 108, which are mutually connected by a bus B.

The keyboard 101 is an example of an input unit provided in the server 30 and may be a mouse or the like. The keyboard 101 is used to input various operation signals to the server 30. The display 102 is an exemplary display unit provided in the server 30. Information related to the object may be displayed on a screen of the display unit.

The communication I/F 107 is an interface provided to connect the server 30 with the network (not illustrated). With this, the server 30 can perform data communication with other apparatuses such as the electronic whiteboard 10, the scanner 15, the notebook PC 40, and the tablet terminal 45 through the communication I/F 107.

The HDD 108 is a non-volatile memory device that stores programs and data. The stored program and data include an operating system (OS) that is basic software controlling the entire apparatus, and application software that provides various functions such as the input process, the entirety displaying process, and the searching and displaying process in the OS. The HDD 108 manages the stored program and data using a predetermined file system or a database such as the event information DB 320.

The external I/F 103 is an interface with an external apparatus. The external apparatus includes a recording medium 103a or the like. With this, the server 30 can read from or write in the recording medium 103a through the external I/F 103. The recording medium 103a includes a compact disk (CD), a digital versatile disk (DVD), an SD memory card, a universal serial bus (USB) memory, or the like.

The ROM 105 is a non-volatile semiconductor memory (a memory device) which can hold internal data even when a power source is powered off. The ROM 105 stores a program or data used for an OS setup, a network setup, or the like. The RAM 104 is a volatile semiconductor memory temporarily storing a program or data. The CPU 106 reads the program or the data into the RAM from the above memory device (for example, the HDD) and executes programs for various processes such as the input process, the entirety displaying process, the searching and displaying process, or the like to substantialize the entire control of the server 30 and the installed display control function. As described, the server 30 of the embodiment can provide various processing services using the above hardware structure. The programs for the input process, the entirety displaying process, the searching and displaying process, and the like may be downloaded through the communication I/F 107. The program recorded in the recording medium 103a may be read and stored in the HDD 108 or the like. The notebook PC 40 and the tablet terminal 45 have a hardware structure substantially the same as the server 30.

The display control system of the embodiment of the present invention can be substantialized by various exemplary system structures in response to uses or purposes. For example, the display control system of the embodiment preferably includes multiple devices of the direct input method and multiple devices of the optical input method as the input unit. However, the embodiment is not limited to this, and it is sufficient to include any one of the device of the direct input method or the device of the optical input method. Further, the numbers of the apparatuses, e.g., the electronic whiteboard 10, included in the display control system may be one or plural. Further, in the display control system of the embodiment, a part of the display control function performed by the server may be instead performed by the tablet terminal 45, the notebook PC 40, and the display apparatus 60 by distributing the part of the display control function among the tablet terminal 45, the notebook PC 40, and the display apparatus 60. Further, the number of the server forming the system may be plural. In this case, a display control function may be provided to any one of the servers.

Further, within the embodiment, the displayed object corresponds to the object information input by the associate participant directly participating in the event using the direct input method or the object information input by the associate participant indirectly participating in the event using the optical input method (the indirect input method). However, the display control system of the embodiment is not limited to use the method of controlling the display of the object information collected by the direct or indirect input method in one event that is specified by the event name 328 of the event information DB 320. For example, the display control system of the embodiment may control the multiple object information collected in multiple events related one another and other than one event by the direct or indirect input method so that the multiple object information is displayed on a same screen. An example of the multiple events related one another is an event held last year and an event held this year among annually held events.

In this case, the display position of the object in a direction parallel with the display surface of the screen and the display position of the object in a depth direction orthogonal to the display surface are controlled based on the information 326 and the weight information 327 each associated with the object information 322 indicating the record of the multiple events. With this, the objects on which the records related to the multiple events are shown in association with the multiple events can be effectively displayed on the screen. Thus, the thoughts of people who participate in the multiple events are associated and displayed on one screen.

Further, the object information 322 stored in the event information DB 320 can be identified by the image ID 321. Therefore, the associate participant of the event can inputs the image ID 321 from the network (not illustrated) later day to obtain desired object information 322.

According to the embodiment, it is possible to effectively display the object on the screen.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the display control apparatus has been described in detail, it should be understood that various changes, substitutions, and alterations could be made thereto without departing from the spirit and scope of the invention.

This application is based upon and claims the benefit of priority of the prior Japanese Patent Application No. 2013-202703, filed on Sep. 27, 2013, the entire contents of which are incorporated herein by reference.

What is claimed is:

1. A display control apparatus comprising:
a processor; and
a memory that communicates with the processor and stores a program that causes the processor to
acquire first object information corresponding to a first object to be displayed on a screen, the first object being generated by one or more participants participating in an event through one or more input devices installed in an event site;
store the acquired first object information corresponding to the first object, time information related to the first object, and a priority related to the first object;
display a second object and one or more first objects corresponding to the stored first object information on the second object;
control a display position of the one or more first objects based on the time information and the priority when the one or more first objects and the second objects are displayed on the screen; and
increase a size of the second object displayed on the screen as the number of the one or more first objects displayed on the second object, on the screen, increases.

2. The display control apparatus according to claim 1, wherein the program further causes the processor to
control the display position of the one or more first objects on a plane parallel to a display surface of the screen based on one of the time information and the priority, and
control the display position of the one or more first objects in a depth direction orthogonal to the display surface of the screen based on another one of the time information and the priority.

3. The display control apparatus according to claim 2, wherein the first object includes a plurality of first objects corresponding to a plurality of first object information, and
wherein the program further causes the processor to
control the display position of the one or more first objects in the depth direction based on the priority so that the first object having a higher priority is displayed at the display position closer to the display surface.

4. The display control apparatus according to claim 2, wherein the first object includes a plurality of first objects corresponding to a plurality of first object information, and
wherein the program further causes the processor to
control the display position of the one or more first objects on the plane parallel to the display surface of the screen so that the first object from among the one or more first objects having a newer date and hour is displayed at an upper part on the plane.

5. The display control apparatus according to claim 2, wherein the first object includes a plurality of first objects corresponding to a plurality of first object information, and
wherein the program further causes the processor to
control the display position of the one or more first objects in the depth direction based on the time information so that the first object from among the one or more first objects having a newer date and hour is displayed at the display position closer to the display surface.

6. The display control apparatus according to claim 2, wherein the first object includes a plurality of first objects corresponding to a plurality of first object information, and
wherein the program further causes the processor to
control the display position of the one or more first objects on the plane parallel to the display surface of the screen so that the first object from among the one or more first objects having a higher priority is displayed at an upper part on the plane.

7. The display control apparatus according to claim 1, wherein the program further causes the processor to
display a display screen, on which an instruction of advancing the priority of a selectable first object can be selected from among the one or more first objects, displayed on the screen is selectable, and advance the priority of the selectable first object in response to a user operation of selecting the instruction of advancing the priority of the selected first object.

8. The display control apparatus according to claim 1, wherein the program further causes the processor to control a display mode of the one or more first objects based on the priority.

9. The display control apparatus according to claim 1, wherein the first object includes a plurality of first objects corresponding to a plurality of first object information, and
wherein a size of the second object is changed based on a number of the one or more first objects displayed on the screen.

10. The display control apparatus according to claim 1, wherein the program further causes the processor to
store identification information of a plurality of events in association with the first object information, and
display the first object from among the one or more first objects corresponding to the first object information, which is stored in association with one event identified by the identification information or a plurality of other events associated with one event.

11. The display control apparatus according to claim 2, wherein the program further causes the processor to
display a display screen, on which a method of controlling the display position of the first object from among the one or more first objects is selectable, and
determine which of the display position of the first object on the plane parallel to the display surface and the display position of the first object on the plane parallel to the display surface of the screen is controlled based on which of the time information and the priority information.

12. The display control apparatus according to claim 1, wherein the program further causes the processor to
acquire identification information of the one or more first objects displayed on the screen in response to a user operation, and
print the first object identified from among one or more first objects by identification information.

13. A display control system comprising:
an object input apparatus that inputs a first object, the first object being generated by one or more participants participating in an event through one or more input devices installed in an event site;
a display control apparatus that performs a display control for displaying the first object; and
a first object display apparatus that displays the first object on a screen and is connected with the first object input apparatus and the display control apparatus through a network,
wherein the display control apparatus includes
a processor; and
a memory that communicates with the processor and stores a program that causes the processor to
acquire first object information corresponding to the first object input into the object input apparatus,
store the acquired first object information corresponding to the first object, time information related to the first object, and a priority related to the first object;
display a second object and one or more first objects corresponding to the stored first object information on the second object;
control a display position of the one or more first objects based on the time information and the priority when the one or more first objects and the second objects are displayed on the screen; and
increase a size of the second object displayed on the screen as the number of the one or more first objects displayed on the second object, on the screen, increases.

14. A method of controlling a display in a display control system that includes
an object input apparatus that inputs a first object, the first object being generated by one or more participants participating in an event through one or more input devices installed in an event site;
a display control apparatus that performs a display control for displaying the first object, and
a first object display apparatus that displays the first object on a screen and is connected with the first object input apparatus and the display control apparatus through a network, the method comprising:
acquiring first object information corresponding to the first object input into the first object input apparatus,
storing the acquired first object information corresponding to the first object, time information related to the first object, and a priority related to the first object;
displaying a second object and one or more first objects corresponding to the stored first object information on the second object;
controlling a display position of the one or more first objects based on the time information and the priority when the one or more first objects and the second objects are displayed on the screen; and
increasing a size of the second object displayed on the screen as the number of the one or more first objects displayed on the second object, on the screen, increases.

15. The display control apparatus according to claim 1, where the second object is a support object on which the one or more first objects are arranged so as to be displayed.

16. The display control apparatus according to claim 1, wherein the program further causes the processor to control the display position of the one or more first objects so that the first object from among the one or more first objects overlaps with at least one other first object from among the one or more first objects when a number of the one or more first objects displayed on the second object exceeds a predetermined number.

17. The display control system as claimed in claim 1, wherein the program further causes the processor, in response to a selection operation to select the first object from among the one or more first objects as displayed on the second object, to zoom in on the first object and display the zoomed-in first object on the screen.

18. The display control system as claimed in claim 1, wherein the second object displayed on the screen is a tree, and the increase in size of the tree is depicted as growth of the tree.

* * * * *